(12) United States Patent
Yuki et al.

(10) Patent No.: US 9,164,216 B2
(45) Date of Patent: Oct. 20, 2015

(54) ILLUMINATION DEVICE AND DISPLAY DEVICE

(75) Inventors: Ryuzo Yuki, Osaka (JP); Takeshi Ishida, Osaka (JP); Fumie Kunimasa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 165 days.

(21) Appl. No.: 14/130,532

(22) PCT Filed: Jun. 13, 2012

(86) PCT No.: PCT/JP2012/065105
§ 371 (c)(1),
(2), (4) Date: Jan. 2, 2014

(87) PCT Pub. No.: WO2013/005542
PCT Pub. Date: Jan. 10, 2013

(65) Prior Publication Data
US 2014/0140095 A1 May 22, 2014

(30) Foreign Application Priority Data
Jul. 6, 2011 (JP) ................. 2011-150273

(51) Int. Cl.
*F21V 7/04* (2006.01)
*F21V 8/00* (2006.01)

(52) U.S. Cl.
CPC ............ *G02B 6/0018* (2013.01); *G02B 6/0016* (2013.01); *G02B 6/0038* (2013.01); *G02B 6/0053* (2013.01)

(58) Field of Classification Search
CPC .... G02B 6/0016; G02B 6/0018; G02B 6/002; G02B 6/0096; G02B 6/0055; G02B 6/0063
USPC .................................... 362/615, 621
See application file for complete search history.

(56) References Cited

U.S. PATENT DOCUMENTS

| 2009/0097275 A1* | 4/2009 | Sato ............................. 362/623 |
| 2009/0207344 A1* | 8/2009 | Ono et al. ........................ 349/65 |
| 2009/0316433 A1* | 12/2009 | Shim et al. .................... 362/613 |
| 2014/0063845 A1* | 3/2014 | Ye et al. ........................ 362/609 |

FOREIGN PATENT DOCUMENTS

JP 2002-169034 A 6/2002

OTHER PUBLICATIONS

Official Communication issued in International Patent Application No. PCT/JP2012/065105, mailed on Sep. 18, 2012.

* cited by examiner

*Primary Examiner* — Ali Alavi
(74) *Attorney, Agent, or Firm* — Keating & Bennett, LLP

(57) ABSTRACT

Provided is an illumination device for obtaining planar light having satisfactory uniformity and suppressed brightness irregularities. A backlight unit (illumination device) (20) comprises a light source and a light-guiding element (23) for guiding light from the light source. The light-guiding element (23) includes prisms (23q) formed in an end area (22b) on the light source side, and prisms (23i) formed in an area (a light-emitting area (22a)) on the side opposite the light source relative to the end area (22b). The prisms (23q) vary the propagation angle of light spreading in a direction intersecting the direction of light entry, more so than the prisms (23i).

14 Claims, 25 Drawing Sheets

FIG.16
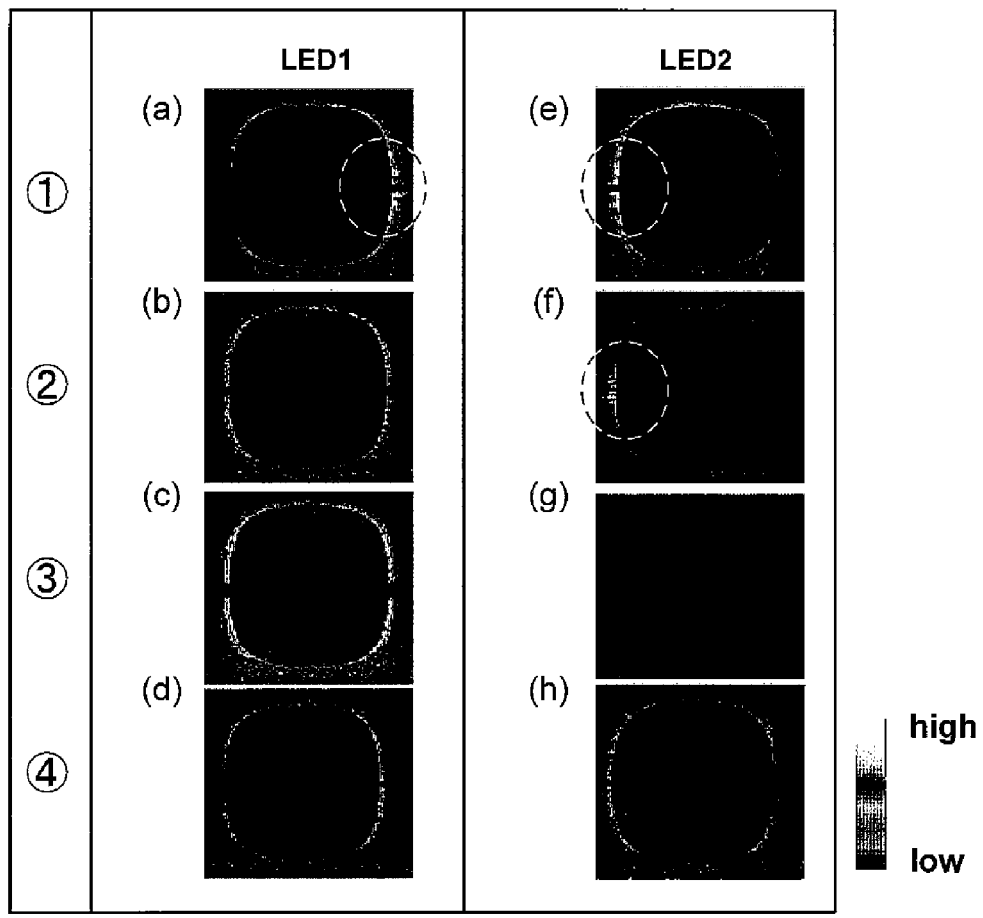
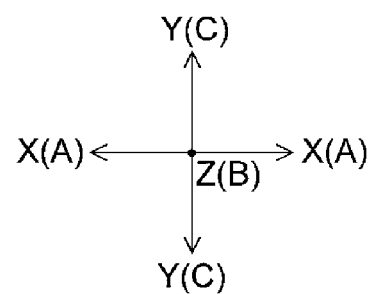

INITIAL STATE

STATE IN
LIGHT-EMITTING AREA

ILLUMINATION DEVICE AND DISPLAY DEVICE

TECHNICAL FIELD

The present invention relates to an illumination device and a display device, and particularly relates to an illumination device equipped with a light-guiding member for guiding light, and a display device comprising this illumination device.

BACKGROUND ART

In a liquid crystal display device (a display device) equipped with a non-light-emitting liquid crystal display panel (a display panel), the liquid crystal display panel is usually also equipped with a backlight unit (an illumination device) for supplying light. The backlight unit is preferably configured so as to generate planar light that pervades throughout the entire planar liquid crystal display panel. Therefore, the backlight unit installed in the liquid crystal display device sometimes includes a light-guiding plate (a light-guiding member) for mixing together light from an internal light source to a high degree.

A known example of a backlight unit containing a light-guiding plate is an edge light (side light) type backlight unit. An edge light type backlight unit is commonly configured with a light source such as an LED (light emitting diode) disposed on the side surface of a light-guiding plate. In a backlight unit having this type of configuration, light emitted from the light source is incident on the light-guiding plate interior from the side surface of the light-guiding plate, and the incident light is guided by the light-guiding plate interior and emitted toward the liquid crystal display panel.

An example of such a backlight unit is disclosed in Patent Literature 1, for example.

Patent Literature 1 discloses an illumination device in which a trapezoidal shape protrudes in a position corresponding to a point light source in the light-guiding plate, and a symmetrical triangular or trapezoidal through-hole (perforation) is provided within this trapezoidal shape. In this illumination device, light from the light source is reflected by the side surface of the protruding trapezoidal shape or the side surface of the through-hole (the perforation), whereby the light incident on the light-guiding plate spreads to the left and right. Uniform outgoing light is thereby achieved.

LIST OF CITATIONS

Patent Literature

Patent Literature 1: Japanese Laid-open Patent Application No. 2002-169034

SUMMARY OF INVENTION

Technical Problem

In an edge light type backlight unit, when a point light source such as an LED is used as the light source, it is difficult to make light uniformly incident on a wide light-guiding plate. Therefore, there are likely to be brightness irregularities with a backlight unit that uses an LED as the light source. Brightness irregularities (V-shaped bright lines and linear irregularities) are a problem particularly in places such as the vicinity of the incident part (light entry part) of the light-guiding plate.

However, although it is possible to achieve outgoing light that is uniform to an extent with the configuration of the illumination device disclosed in Patent Literature 1, it is difficult to effectively improve brightness irregularities in places such as the vicinity of the light entry part, and there is still room for improvement with brightness irregularities.

The invention was devised in order to resolve problems such as those described above, and one object of the invention is to provide an illumination device that produces planar light having suppressed brightness irregularities and satisfactory uniformity, and a display device comprising this illumination device.

Solution to Problem

To achieve the object described above, an illumination device according to a first aspect of the invention comprises a light source and a light-guiding element for guiding light from the light source. The light-guiding element includes a first reflective part formed in an end area on the light source side, and a second reflective part formed in an area on the side opposite the light source relative to the end area. The first reflective part greatly varies the propagation angle of light spreading in a direction intersecting the direction of light entry.

In the illumination device according to the first aspect, light from the light source incoming on the light-guiding element can be reflected by the first reflective part, by forming the first reflective part in the end area on the light source side of the light-guiding element. The first reflective part can cause the propagation angle of light spreading in a direction intersecting the direction of light entry to vary to a greater extent than the second reflective part. Therefore, the spread of light in a direction intersecting the direction of entry can be suppressed by the first reflective part. The V-shaped bright lines described above occur due to light spreading in a transverse direction within the light-guiding element. Therefore, the occurrence of V-shaped bright lines can be effectively suppressed by suppressing the spread of light in a direction intersecting the direction of entry. Light utilization efficiency and brightness can be effectively improved because the light that forms the V-shaped bright lines can be effectively utilized by suppressing the occurrence of the V-shaped bright lines.

To suppress the occurrence of V-shaped bright lines, it is effective to suppress the spreading of light in a direction intersecting the direction of entry. However, there are linear irregularities (linear light irregularities extending in the direction of entry) when the spread of light is suppressed too much. Therefore, the second reflective part is formed in an area on the side opposite the light source relative to the end area. The second reflective part has less of an effect of varying the propagation angle of light spreading in a direction intersecting the direction of light entry than the first reflective part. In other words, the light is spread in a direction intersecting the direction of light entry. Therefore, the light can be diffused appropriately by the second reflective part in the area on the side opposite the light source relative to the end area. The occurrence of linear irregularities can thereby be suppressed.

Thus, in the first aspect, the occurrence of V-shaped bright lines and linear irregularities can be suppressed by forming the first reflective part and the second reflective part in the light-guiding element. Therefore, planar light of satisfactory uniformity can be achieved because the brightness irregularities can be effectively improved.

In the illumination device according to the first aspect, the first reflective part preferably reflects incoming light in a direction toward the optical axis of light from the light source.

With such a configuration, the light of components that form the V-shaped bright lines can be effectively varied to light of components that do not form the V-shaped bright lines. The occurrence of V-shaped bright lines can thereby be effectively suppressed, and the occurrence of brightness irregularities caused by the V-shaped bright lines can therefore be effectively suppressed in the planar light emitted from the illumination device.

In the illumination device according to the first aspect, the first reflective part and the second reflective part preferably have different shapes. With such a configuration, the configuration can easily be designed so that light spreading in a direction intersecting the direction of light entry has a different propagation angle between the first reflective part and the second reflective part.

The light-guiding element can be configured having a light entry surface which is a side surface where light from the light source enters. In this case, the first reflective part can be configured having a first inclined surface extending in a substantially orthogonal direction from the light entry surface, as seen in plan view. The second reflective part can be configured having a second inclined surface extending in a substantially orthogonal direction relative to the light entry surface. With such a configuration, light spreading in a direction intersecting the direction of light entry can be made to have a different propagation angle by using the first inclined surface to reflect the light entering the light-guiding element. The occurrence of V-shaped bright lines can thereby be suppressed more effectively. Light can also be diffused by using the second inclined surface to reflect the light. The occurrence of linear irregularities can thereby be suppressed more effectively.

When the light-guiding element has a front surface (a top surface) and a rear surface (a bottom surface), the first reflective part and the second reflective part can be formed on the front surface (the top surface) or the rear surface (the bottom surface) of the light-guiding element. Specifically, the first reflective part can be formed on either the front surface (the top surface) or the rear surface (the bottom surface) of the light-guiding element. Similarly, the second reflective part can be formed on either front surface (the top surface) or the rear surface (the bottom surface) of the light-guiding element.

In the illumination device according to the first aspect, preferably, the light-guiding element has a light-emitting area for emitting incoming light as planar light, and the second reflective part is formed on the light-emitting area. With such a configuration, brightness irregularities of the light-emitting area can be effectively suppressed, and illumination quality can therefore be effectively improved.

The first reflective part and the second reflective part of the light-guiding element can be formed as continuations of each other. In this case, the first reflective part and the second reflective part extend continuously in a substantially orthogonal direction relative to the light entry surface as seen in plan view, the reflective parts have concave parts or convex parts including inclined surfaces, and the depths of the concave parts or the heights of the convex parts preferably increase nearer to the light entry surface. Even in cases of such a configuration, the occurrence of V-shaped bright lines and linear irregularities can be effectively suppressed.

Furthermore, a reflective layer for reflecting light emitted from the first reflective part to the exterior is preferably provided on the first reflective part. With such a configuration, light emitted into air layer, for example, can be reflected by the reflective layer and directed into the light-guiding element. Light loss can thereby be reduced, and light utilization efficiency can therefore be improved.

In this case, the reflective layer is preferably provided so as to cover all or part of the end area on the light source side of the light-guiding element. Specifically, the reflective layer is preferably provided so as to cover at least part of the first reflective part (e.g. the end area on the light source side).

The illumination device according to the first aspect preferably comprises a light-guiding member including the light-guiding element and a low-refractive-index layer having a lower refractive index than the light-guiding element. In this case, the low-refractive-index layer is preferably provided on the rear surface of the light-guiding element without any air layer in between. The front surface or rear surface of the light-guiding element is preferably provided with a plurality of third reflective parts that gradually reduce the incidence angle of the light from the light source relative to the rear surface of the light-guiding element, and the rear surface of the light-guiding member is preferably provided with a plurality of fourth reflective parts that fully reflect light from the light source forward in the interface between the rear surface of the light-guiding member and the air layer.

Thus, by providing the front surface or rear surface of the light-guiding element with a plurality of third reflective parts that gradually reduce the incidence angle of the light from the light source relative to the rear surface of the light-guiding element, and by providing the rear surface of the light-guiding member with a plurality of fourth reflective parts that fully reflect light from the light source forward in the interface between the rear surface of the light-guiding member and the air layer, the light from the light source is guided while being repeatedly reflected between the front surface portion and the rear surface of the light-guiding element, and the incidence angle of the light relative to the rear surface of the light-guiding element gradually decreases. When the incidence angle of the light relative to the rear surface of the light-guiding element is less than the critical angle of the light-guiding element and the low-refractive-index layer, the light from the light source is incident on the low-refractive-index layer. Therefore, the light incident on the low-refractive-index layer has a smaller spread angle, and the light reflected in the interface between the rear surface of the light-guiding member and the air layer also has a smaller spread angle. The spread angle of light emitted from the light-guiding member can thereby be made smaller. As a result, the light-collecting characteristic can be improved. Additionally, brightness can also be improved.

With the configuration described above, because the light-collecting characteristic and brightness can be improved without providing a plurality of optical sheets such as collecting lenses on the light-guiding member, there is no need to provide optical sheets. Therefore, the illumination device can be made thinner and manufacturing costs can be reduced by using a configuration having no optical sheets. Furthermore, the configuration having no optical sheets can improve light utilization efficiency because there is no loss of light when the light passes through optical sheets (there is no light loss due to multiple reflection between the sheets, for example).

Due to the third reflective parts being provided to the front surface or rear surface of the light-guiding element, light from the light source is guided while being repeatedly reflected between the front surface portion and the rear surface of the light-guiding element, and as the light gets farther from the light source, the incidence angle of the light relative to the rear surface of the light-guiding element becomes smaller. Therefore, as the light gets farther from the light source, the light from the light source is more likely to be incident on the low-refractive-index layer. Therefore, the quantity of light incident on the low-refractive-index layer can be made uniform in portions near the light source and greater in light quantity (luminous flux) and portions far from the light source and lesser in light quantity (luminous flux). As a result, light can be emitted uniformly from the light-guiding member. Additionally, the brightness can be made uniform.

Furthermore, due to the rear surface of the light-guiding member being provided with a plurality of fourth reflective parts that reflect light from the light source forward, the light can be uniformly reflected by the fourth reflective parts. The occurrence of dot irregularities can thereby be suppressed, and brightness can be made more uniform. The fourth reflective parts are preferably provided to substantially the entire rear surface of the light-guiding member, because light can then be emitted more uniformly from substantially the entire light-emitting area of the light-guiding member.

Because the plurality of fourth reflective parts have the function of fully reflecting light from the light source, the light incident on the low-refractive-index layer from the light-guiding element can be emitted from the rear surface of the light-guiding member, and light loss can be suppressed. Light absorption in the fourth reflective parts is also suppressed because the fourth reflective parts fully reflect light. Light utilization efficiency can thereby be further improved.

With such a configuration, brightness irregularities occur readily in the form of V-shaped bright lines and linear irregularities. However, the occurrence of V-shaped bright lines and linear irregularities can be effectively suppressed by providing the first reflective part and the second reflective part to the light-guiding element. Therefore, light utilization efficiency and brightness can be improved while suppressing the occurrence of brightness irregularities. Additionally, the device can be made thinner and costs can be lowered.

The illumination device according to the first aspect can also be configured including an optical sheet overlapping the light-guiding element. In this case, the optical sheet has a prism surface, and the prism surface is preferably disposed so as to face the light-guiding element. With such a configuration, the number of optical sheets can be reduced while improving brightness. When the device is configured as such, V-shaped bright lines and linear irregularities occur readily. However, due to the first reflective part and the second reflective part being provided to the light-guiding element, the occurrence of V-shaped bright lines and linear irregularities can be effectively suppressed.

In the illumination device according to the first aspect, the front surface and the rear surface of the light-guiding element can be formed so as to be substantially parallel to each other.

The display device according to a second aspect of the invention comprises the illumination device according to the first aspect, and a display panel for receiving light from the illumination device. With such a configuration, a display device of high display quality can be obtained in which brightness irregularities are suppressed.

Advantageous Effects of the Invention

As described above, according to the present invention, it is possible to easily obtain an illumination device whereby brightness irregularities are suppressed and planar light of satisfactory uniformity is achieved, as well as a display device comprising this illumination device.

BRIEF DESCRIPTION OF DRAWINGS

FIG. 16 is a diagram showing the angular distributions of light in the areas of FIG. 15;

DESCRIPTION OF EMBODIMENTS

Embodiments that specify the present invention are described in detail below based on the drawings.

First Embodiment

Figure 1:
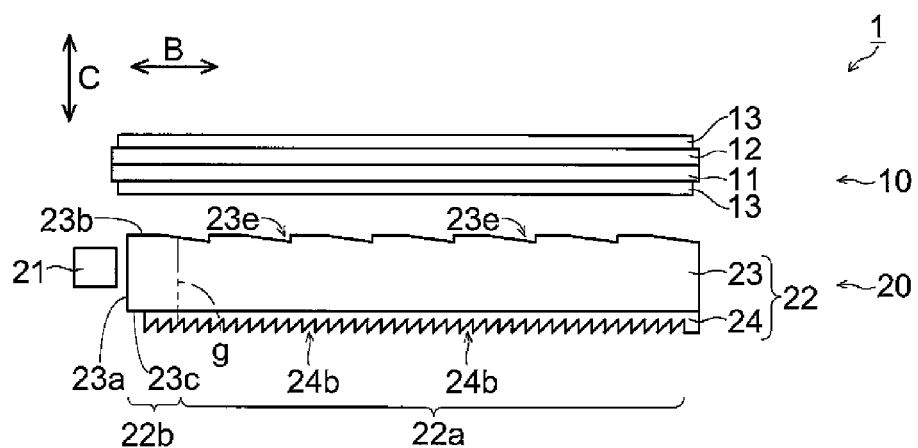
FIG. 1 is a side view of a liquid crystal display device comprising a backlight unit according to the first embodiment of the present invention.
Figure 2:
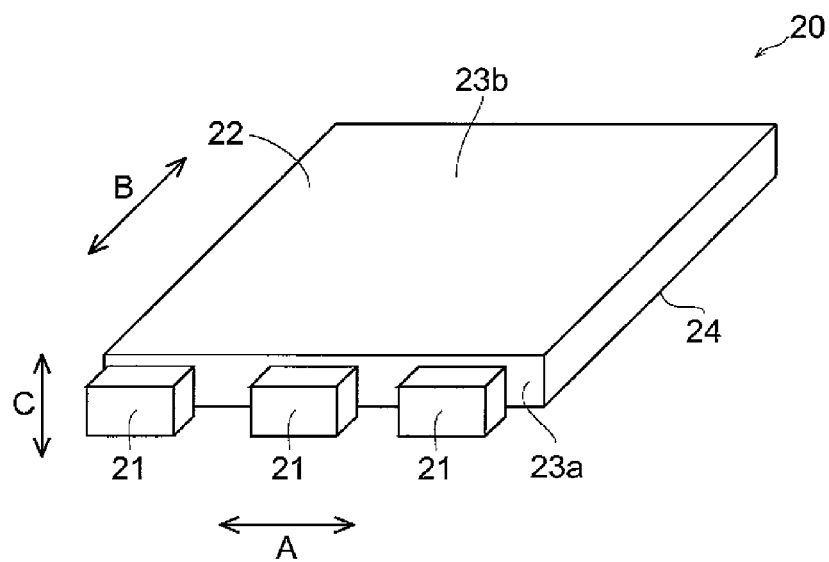
FIG. 2 is a perspective view schematically depicting the backlight unit according to the first embodiment of the present invention.
Figure 3:
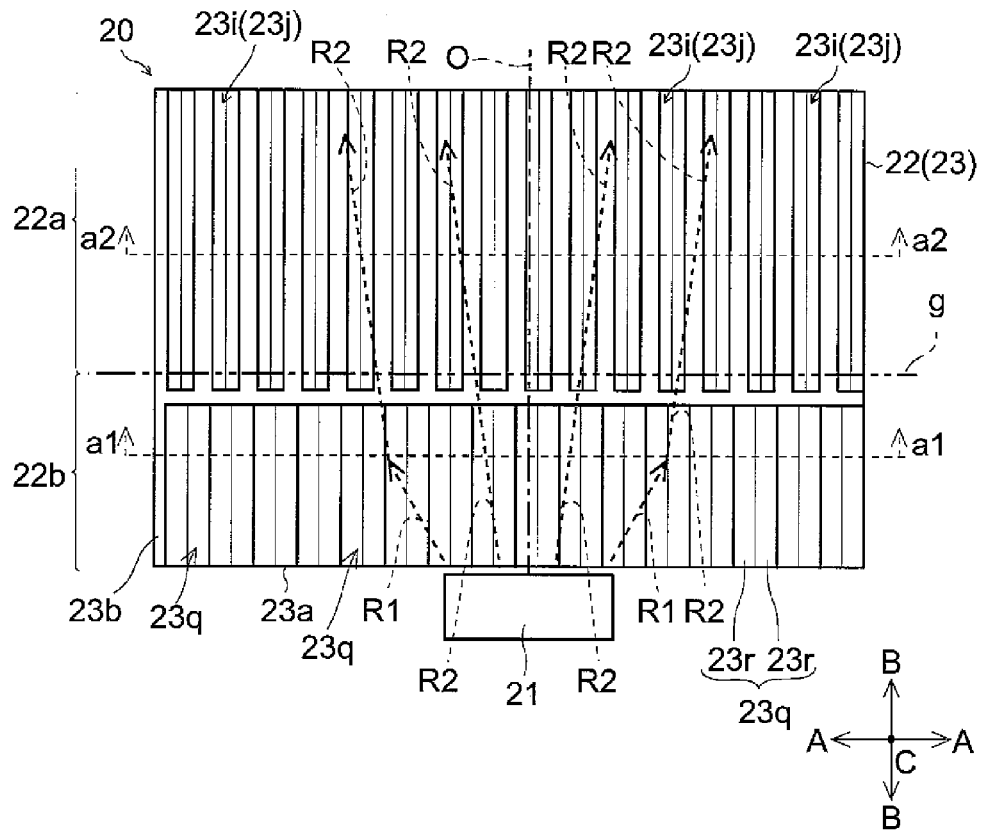
FIG. 3 is a plan view schematically depicting part of the backlight unit according to the first embodiment of the present invention.

FIG. 1 is a side view of a liquid crystal display device comprising a backlight unit according to the first embodiment of the present invention. FIG. 2 is a perspective view schematically depicting the backlight unit according to the first embodiment of the present invention. FIG. 3 is a plan view schematically depicting part of the backlight unit according to the first embodiment of the present invention. FIGS. 4 to 26 are diagrams for describing the backlight unit according to the first embodiment of the present invention. The backlight unit according to the first embodiment of the present invention and a liquid crystal display device comprising this backlight unit are first described with reference to FIGS. 1 to 26.

A liquid crystal display device 1 according to the first embodiment comprises a liquid crystal display panel 10, a backlight unit 20 disposed on the rear surface side of the liquid crystal display panel 10, and a frame (not shown) for accommodating the liquid crystal display panel 10 and the backlight unit 20, as shown in FIG. 1. The liquid crystal display device 1 is one example of the "display device" of the present invention, and the liquid crystal display panel 10 is one example of the "display panel" of the present invention. The backlight unit 20 is one example of the "illumination device" of the present invention.

The liquid crystal display panel 10 is configured by using a sealant (not shown) to stick together an active matrix substrate 11 including a switching element such as a thin film transistor (TFT), and an opposing substrate 12 facing the active matrix substrate 11, for example. Liquid crystal (not shown) is poured into the gap between the substrates 11 and 12. Polarizing films 13 are attached to both the light-receiving surface side of the active matrix substrate 11 and the outgoing surface side of the opposing substrate 12.

The liquid crystal display panel 10 configured in this manner utilizes the change in transmittance caused by the slant of the liquid crystal molecules to display an image.

Figure 4:
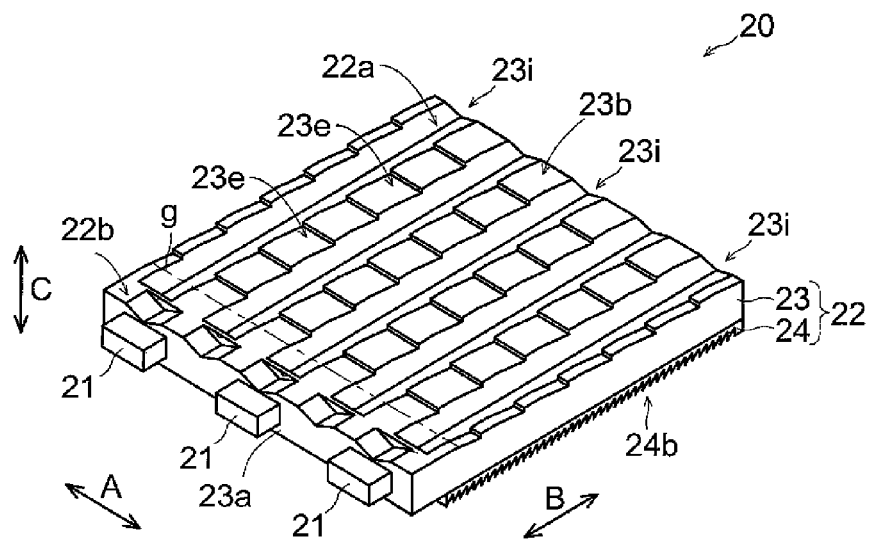
FIG. 4 is a perspective view schematically depicting the backlight unit according to the first embodiment of the present invention.

The backlight unit 20 according to the first embodiment is an edge light type of backlight unit. The backlight unit 20 includes LEDs 21 as a light source and a light-guiding plate 22 for guiding light from the LEDs 21, as shown in FIGS. 1, 2, and 4. The backlight unit 20 comprises a plurality of the LEDs 21, and these LEDs 21 are disposed so as to be aligned in the A direction (e.g. the width direction of the light-guiding plate 22: see FIG. 2). The light-guiding plate 22 is one example of the "light-guiding member" of the present invention.

The first embodiment is a configuration in which an optical sheet such as a collecting lens is not provided between the liquid crystal display panel 10 and the light-guiding plate 22 of the backlight unit 20, as shown in FIG. 1. Specifically, the backlight unit 20 of the first embodiment is a sheet-less backlight.

The light-guiding plate 22 is composed of a single plate-shaped member. The light-guiding plate 22 is configured including a light-guiding element 23 having a light-incident surface (light entry surface) 23a on which light from the LEDs 21 is incident, and a low-refractive-index layer 24 having a lower refractive index than the light-guiding element 23, as shown in FIGS. 1 and 4. The light-guiding element 23 is composed of a transparent material having a refractive index of (n1), and the low-refractive-index layer 24 is composed of a transparent material having a refractive index of (n2).

The refractive index (n1) of the light-guiding element 23 is preferably 1.42 or greater, and more preferably 1.59 to 1.65. The refractive index (n2) of the low-refractive-index layer 24 is preferably less than 1.42, and more preferably 1.10 to 1.35. A relationship of n2<n1 is established between the refractive index (n1) of the light-guiding element 23 and the refractive index (n2) of the low-refractive-index layer 24. In this case, the relationship n1/n2>1.18 is preferably established between the refractive index (n1) of the light-guiding element 23 and the refractive index (n2) of the low-refractive-index layer 24.

The light-guiding element 23 constituting the light-guiding plate 22 is configured from a transparent resin material such as acrylic or polycarbonate, for example. If the light-guiding element 23 is configured from acrylic or the like, the refractive index of the light-guiding element 23 can be approximately 1.49. If the light-guiding element 23 is configured from polycarbonate or the like, the refractive index of the light-guiding element 23 can be approximately 1.59. When the light-guiding element 23 is configured from acrylic, transparency can be improved more than in cases in which the light-guiding element 23 is configured from polycarbonate.

The light-guiding element 23 is formed into a substantial rectangular solid. Specifically, the light-guiding element 23 is formed so that a light-emitting surface 23b (top surface) and a rear surface 23c (bottom surface) are substantially parallel. The light-incident surface (light entry surface) 23a of the light-guiding element 23 is disposed to be substantially parallel with the light-emitting surfaces of the LEDs 21. The light-incident surface 23a is composed of the side surface of the light-guiding element 23.

Figure 5:
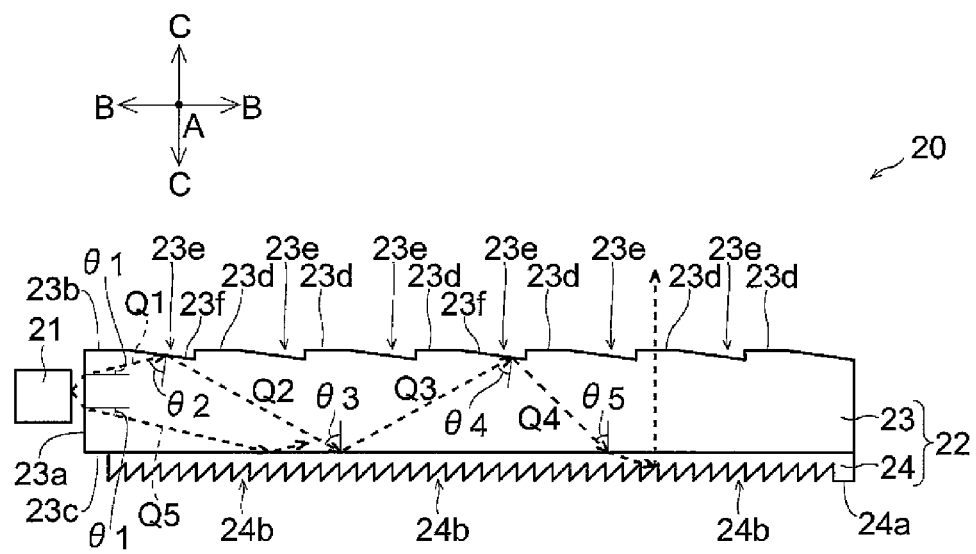
FIG. 5 is a cross-sectional view schematically depicting the backlight unit according to the first embodiment of the present invention, and is also an optical path diagram depicting the light's optical path.

The low-refractive-index layer 24 is formed integrally on the rear surface 23c of the light-guiding element 23 without any air layer or the like in between, as shown in FIG. 5. The low-refractive-index layer 24 has a thickness of approximately 10 μm to approximately 50 μm, for example.

The low-refractive-index layer 24 is configured from a transparent resin material having a lower refractive index than the light-guiding element 23, as described above. Possible examples of such a resin material include fluorinated acrylate, a resin containing empty particles of a nanosized inorganic filler, or the like. If the low-refractive-index layer 24 is configured from a fluorinated acrylate or the like, the refractive index of the low-refractive-index layer 24 can be approximately 1.35. If the low-refractive-index layer 24 is configured from a resin or the like containing empty particles of a nanosized inorganic filler or the like, the refractive index of the low-refractive-index layer 24 can be 1.30 or less.

In the first embodiment, a plurality of prisms 23e that gradually reduce the incidence angle of light from the LEDs 21 relative to the rear surface 23c of the light-guiding element 23 are formed in the light-emitting surface 23b of the light-guiding element 23. Specifically, a plurality of flat surface parts 23d and a plurality of concave prisms 23e are alternately formed in the light-emitting surface 23b of the light-guiding element 23, along the normal direction of the light-incident surface 23a of the light-guiding element 23 (the B direction (a direction orthogonal to the A direction). Specifically, the flat surface parts 23d are formed between the prisms 23e which are adjacent to each other in the B direction (e.g. the length direction of the light-guiding plate 22). The flat surface parts 23d and the prisms 23e are formed so as to extend in the A direction (see FIG. 2). The flat surface parts 23d and the prisms 23e are divided by prisms 23i described hereinafter. The prisms 23e are one example of the "third reflective parts" of the present invention.

Figure 6:
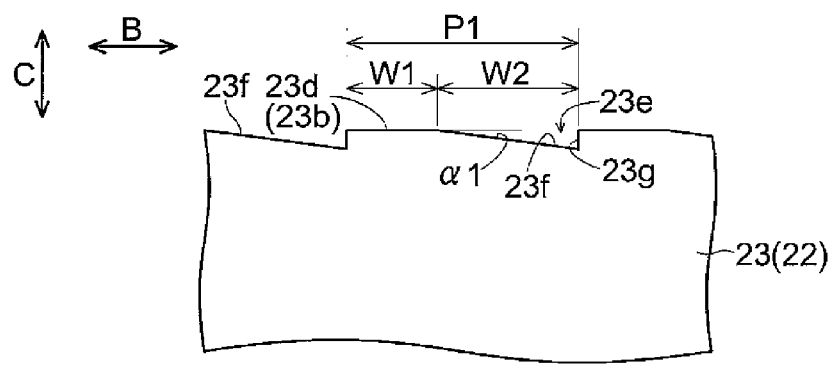
FIG. 6 is an enlarged cross-sectional view depicting the structure of the light-emitting surface of the light-guiding element of the backlight unit according to the first embodiment of the present invention.

The flat surface parts 23d are formed in the same plane as the light-emitting surface 23b, and are formed substantially parallel to the rear surface 23c. The flat surface parts 23d are formed so as to have a predetermined width W1 in the B direction, as shown in FIG. 6.

The concave prisms 23e are formed by inclined surfaces 23f that are inclined relative to the flat surface parts 23d (the light-emitting surface 23b), and perpendicular surfaces 23g that are substantially perpendicular to the flat surface parts 23d (the light-emitting surface 23b). The inclined surfaces 23f are formed so as to be nearer to the rear surface 23c the farther they are from the LEDs 21, as shown in FIG. 5. The light emitted from the LEDs 21 is thereby repeatedly reflected between the inclined surfaces 23f (the prisms 23e) and the rear surface 23c of the light-guiding element 23 as is described hereinafter, whereby the incidence angle relative to the rear surface 23c of the light-guiding element 23 gradually decreases. The incline angle α1 of the inclined surfaces 23f relative to the flat surface parts 23d is preferably an angle of 5° or less, and is more preferably an angle of 0.1° to 3.0°, as shown in FIG. 6.

The inclined surfaces 23f (the prisms 23e) are formed so as to have a predetermined width W2 in the B direction. The width W2 of the inclined surfaces 23f (the prisms 23e) in the B direction is preferably 0.25 mm or less, and more preferably 0.01 mm to 0.10 mm. The inclined surfaces 23f (the prisms 23e) are disposed at a predetermined pitch P1 (=W1+W2) in the B direction.

The width W1 of the flat surface parts 23d in the B direction, the incline angle α1 of the inclined surfaces 23f, the width W2 of the inclined surfaces 23f (the prisms 23e) in the B direction, and the pitch P1 of the inclined surfaces 23f (the prisms 23e) in the B direction may be constant regardless of the distance from the LEDs 21.

Figure 7:
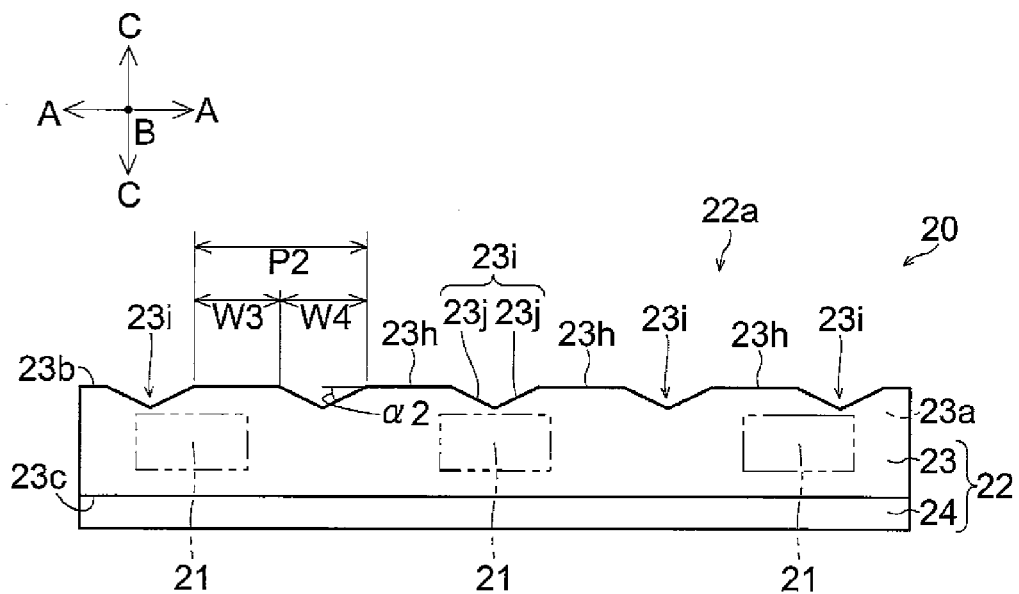
FIG. 7 is a cross-sectional view (of the light-emitting area) schematically depicting the backlight unit according to the first embodiment of the present invention.
Figure 11:
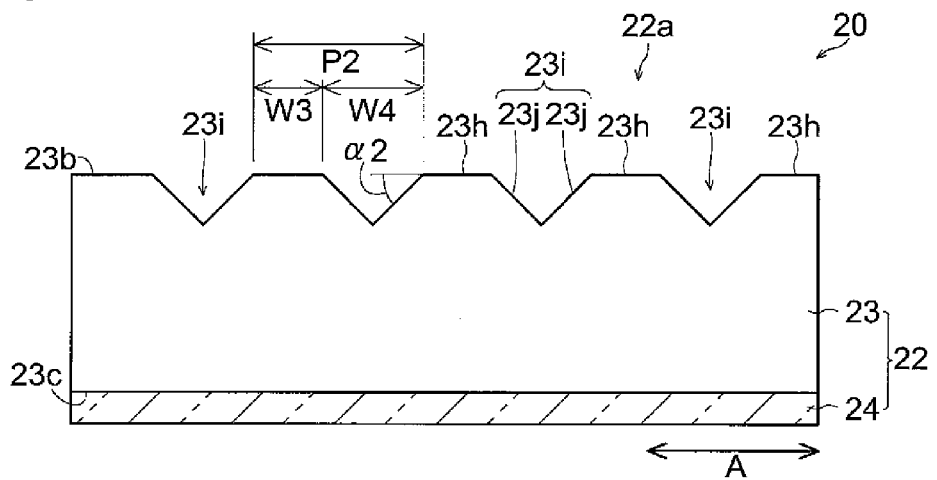
FIG. 11 is a drawing corresponding to the cross section along line $\alpha 2$-$\alpha 2$ in FIG. 3.

In the first embodiment, a plurality of flat surface parts 23h and a plurality of concave prisms 23i are formed alternately along the A direction in the light-emitting surface 23b of the light-guiding element 23, as shown in FIGS. 7 and 11. Specifically, the flat surface parts 23h are formed between adjacent prisms 23i along the A direction. The flat surface parts 23h and prisms 23i are both formed so as to extend along the normal direction of the light-incident surface 23a of the light-guiding element 23 (the B direction). Specifically, the flat surface parts 23h and the prisms 23i (inclined surfaces 23j) are formed so as to extend in a direction substantially perpendicular to the light-incident surface 23a (the B direction), when seen in plan view.

The flat surface parts 23h are formed in the same plane as the light-emitting surface 23b. The flat surface parts 23h are formed so as to have a predetermined width W3 in the A direction. The width W3 of the flat surface parts 23h is preferably 200 µm or less.

Each concave prism 23i is formed by a pair of inclined surfaces 23j that are inclined relative to the flat surface parts 23h (the light-emitting surface 23b). Specifically, each concave prism 23i is formed so as to have a triangular cross section. The incline angle (relative to the flat surface parts 23h) α2 of each pair of inclined surfaces 23j is preferably approximately 30° to approximately 89°. The prisms 23i are one example of the "second reflective part" of the present invention, and the inclined surfaces 23j are one example of the "second inclined surface" of the present invention.

Each pair of inclined surfaces 23j (prism 23i) is formed so as to have a predetermined width W4 in the A direction. The width W4 of each pair of inclined surfaces 23j (prism 23i) in the A direction is preferably approximately 0.1 mm or less, and more preferably approximately 0.010 mm (10 µm) to approximately 0.020 mm (20 µm).

The pitch P2 (=W3+W4) of the prisms 23i in the A direction is preferably P2<W4×2 (W3/W4<1). Specifically, the width W3 of each flat surface part 23h in the A direction is preferably less than the width W4 of each pair of inclined surfaces 23j in the A direction.

The prisms 23i are preferably formed with the same shape, the same size, and the same pitch, regardless of the positions where they are formed in the plane of the light-guiding element 23. Specifically, the width W3 of each flat surface part 23h in the A direction, the incline angle (relative to the flat surface parts 23h) α2 of each pair of inclined surfaces 23j, the width W4 of each pair of inclined surfaces 23j (prism 23i) in the A direction, and the pitch P2 of each pair of inclined surfaces 23j (prism 23i) in the A direction are all preferably constant.

Thus, in the first embodiment, the prisms 23i are formed in the same plane as the prisms 23e so as to overlap the prisms 23e (the prisms 23e and the prisms 23i are formed in the light-emitting surface 23b of the light-guiding element 23). The prisms 23i have the function of diffusing light in a transverse direction (the A direction: intersecting the direction of light entry). The ratio of occupied surface area of the prisms 23i relative to the prisms 23e is preferably 50% or greater.

A plurality of concave prisms 24b are formed in the rear surface 24a of the low-refractive-index layer 24 (the rear surface of the light-guiding plate 22), as shown in FIG. 1. These prisms 24b are formed at least throughout the entire light-emitting area 22a of the light-guiding plate 22. The prisms 24b are also formed so as to extend in the A direction (see FIG. 4). The light-emitting area 22a of the light-guiding plate 22 is disposed so as to correspond to the display area of the liquid crystal display panel 10. The prisms 24b are one example of the "fourth reflective parts" of the present invention.

Figure 9:
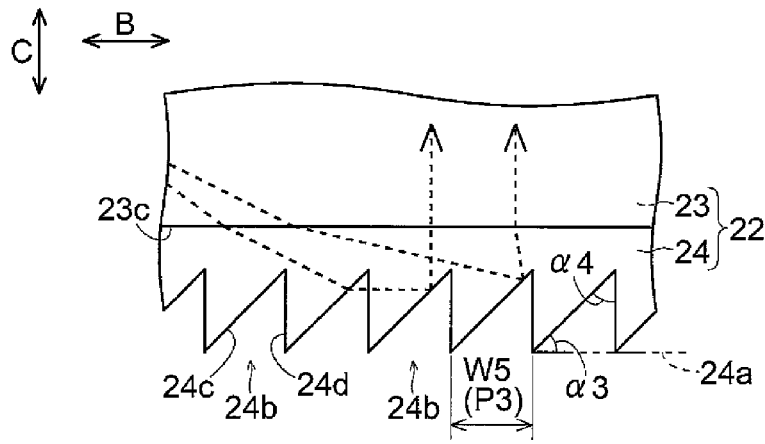
FIG. 9 is an enlarged cross-sectional view depicting the structure on the rear surface side of the backlight unit according to the first embodiment of the present invention, and is also an optical path diagram depicting the light's optical path.

The concave prisms 24b are formed by inclined surfaces 24c that are inclined relative to the rear surface 24a, and perpendicular surfaces 24d that are perpendicular to the rear surface 24a, as shown in FIG. 9.

In the first embodiment, the inclined surfaces 24c are formed as flat surfaces rather than curved surfaces. The inclined surfaces 24c are formed so as to be nearer to the light-guiding element 23 the farther they are from the LEDs 21 (see FIG. 1). In this case, the incline angle α3 of the inclined surfaces 24c relative to the rear surface 24a is preferably approximately 40° to approximately 50°. Specifically, the angle α4 formed by each inclined surface 24c and each perpendicular surface 24d is preferably approximately 50° to approximately 40°.

The inclined surfaces 24c (the prisms 24b) are formed so as to each have a predetermined width W5 in the B direction. The width W5 of each inclined surface 24c (prism 24b) in the B direction is approximately 0.1 mm or less, and is preferably approximately 0.010 mm to approximately 0.025 mm.

Furthermore, the inclined surfaces 24c (prisms 24b) are disposed in the B direction at a pitch P3 of the same size as the width W5. Specifically, the plurality of prisms 24b are formed continuously without any gaps in the B direction, and there are no flat surface parts between one prism 24b and another.

The prisms 24b may be formed throughout substantially the entire rear surface 24a of the low-refractive-index layer 24, with the same shape, the same size, and the same pitch, regardless of the positions where they are formed in the plane of the low-refractive-index layer 24. Thus, if the prisms 24b are formed with the same shape, the same size, and the same pitch, differences in light-collecting characteristics of the prisms can be suppressed within the plane of the low-refractive-index layer 24. It is thereby possible to make the brightness of the liquid crystal display panel 10 (see FIG. 1) uniform.

As described hereinafter, the prisms 24b have the function of fully reflecting light from the LEDs 21 forward (toward the top surface) in the interface between the light-guiding plate 22 and the air layer.

Figure 8:
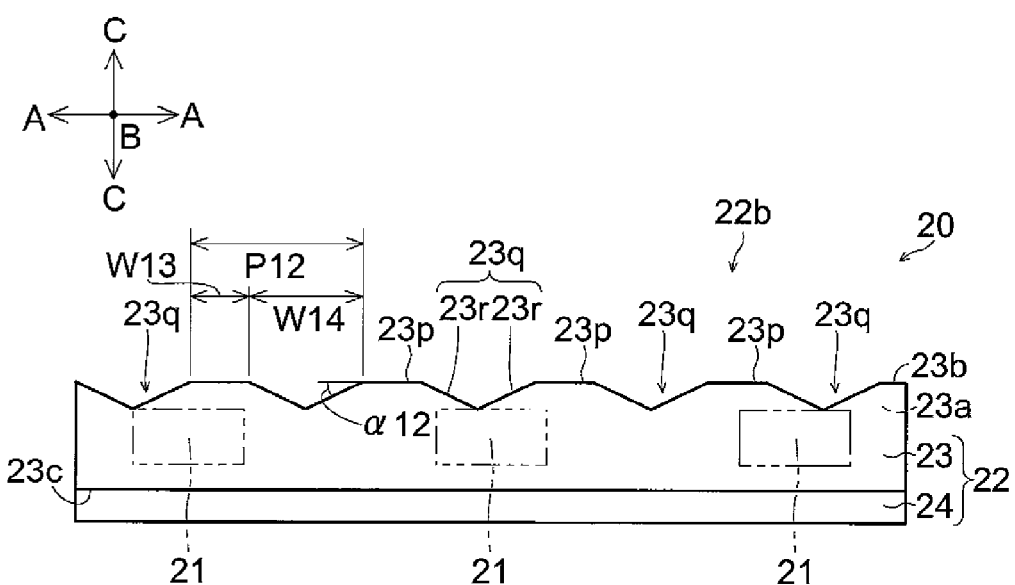
FIG. 8 is a cross-sectional view (of the end area) schematically depicting the backlight unit according to the first embodiment of the present invention.
Figure 10:
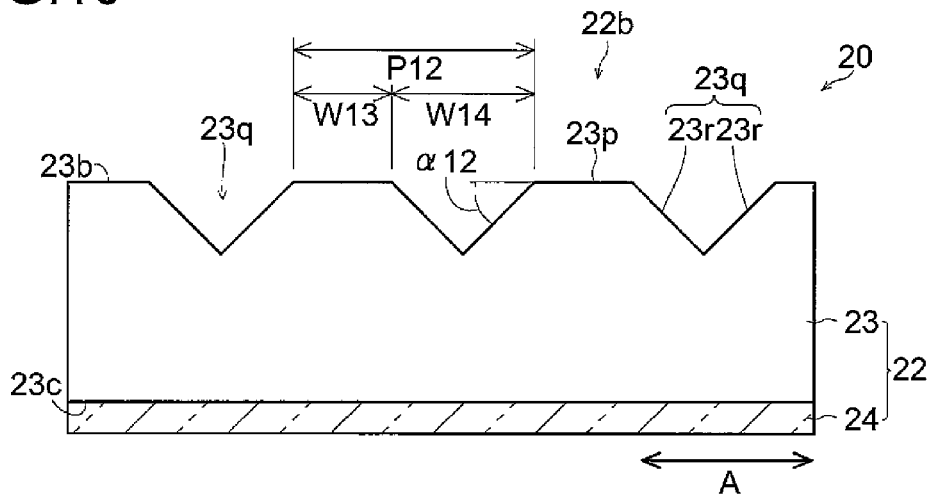
FIG. 10 is a drawing corresponding to the cross section along line $\alpha 1$-$\alpha 1$ in FIG. 3.

In the first embodiment, a plurality of concave prisms 23q are formed along the A direction in the end of the light-guiding plate 22 on the side having the LEDs 21 (an end area 22b (near the light entry part)), as shown in FIGS. 3 and 4. These prisms 23q are formed so as to have triangular cross sections, as shown in FIGS. 8 and 10. The prisms 23q each have a pair of inclined surfaces 23r. The prisms 23q are one example of the "first reflective part" of the present invention, and the inclined surfaces 23r are one example of the "first inclined surface" of the present invention.

Figure 12:
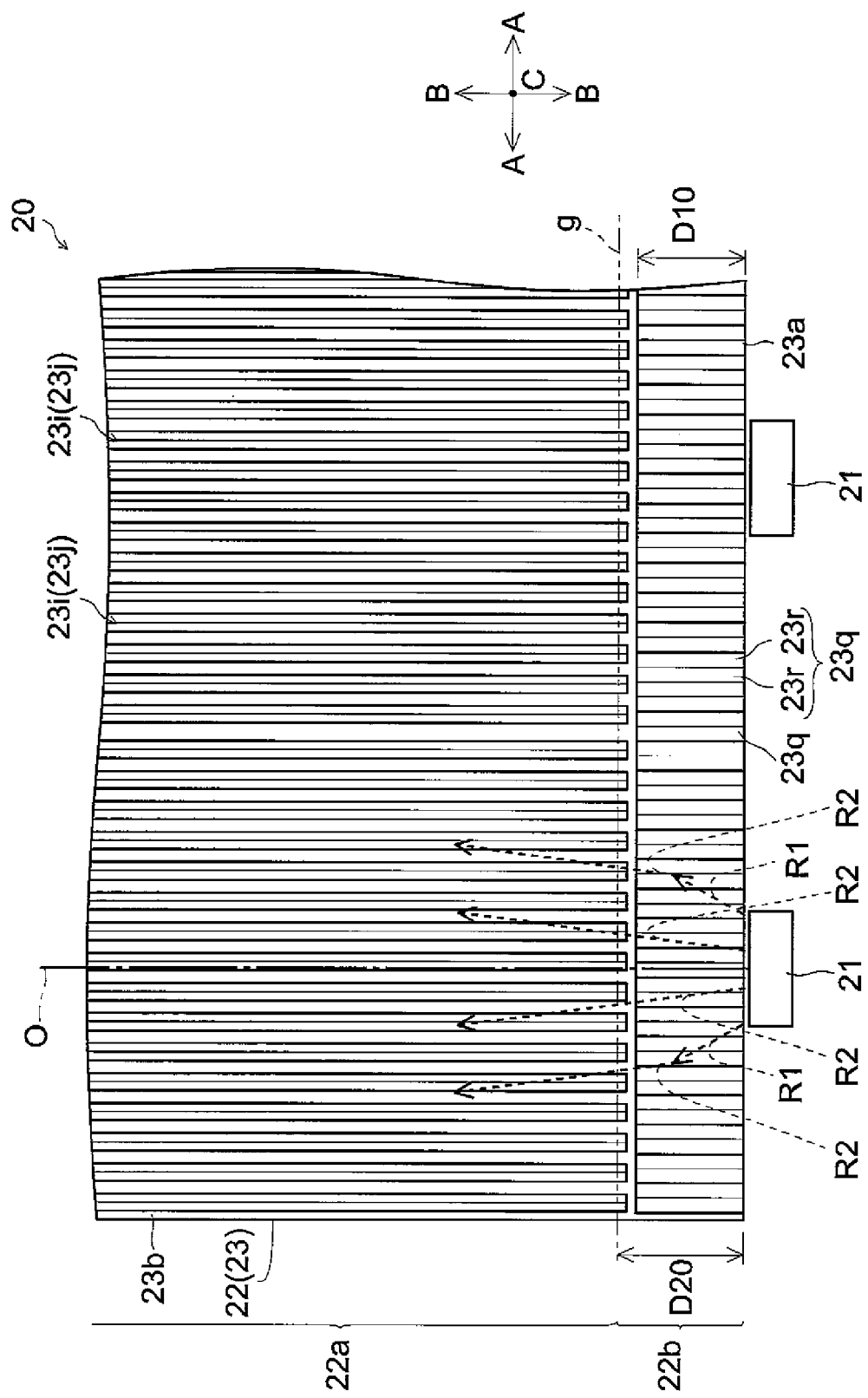
FIG. 12 is a plan view schematically depicting part of the backlight unit according to the first embodiment of the present invention.

To describe in detail, the light-guiding plate 22 (the light-guiding element 23) of the first embodiment seen in plan view has an area 22a corresponding to the display area of the liquid crystal display panel 10 (see FIG. 1) (the light-emitting area 22a that emits planar light forward toward the liquid crystal display panel 10), and the end area 22b on the LED 21 side of the light-guiding plate 22 (the area near the light entry part), as shown in FIGS. 1 and 3. The end area 22b is adjacent to the light-emitting area 22a. The end area 22b is the area from the light-incident surface 23a up to a distance D20 in the B direction, as shown in FIG. 12. Specifically, the border (an imaginary line g) between the end area 22b and the light-emitting area 22a is set at a position separated from the light-incident surface 23a by the distance D20 in the B direction. The distance D20 differs depending on factors such as the design of the liquid crystal display panel and the intervals between the light sources, but when the interval between each light sources is P, the distance can be 0.5≤D20/P≤2. The light-emitting area 22a is the area on the side opposite the LEDs relative to the end area 22b. A plurality of the concave prisms 23q are formed in the end area 22b (near the light entry part) in the front surface (the top surface) of the light-guiding plate 22 (the light-guiding element 23).

The concave prisms 23q are formed so as to extend in the normal direction of the light-incident surface 23a (the B direction) similar to the prisms 23i described above, as shown in FIG. 3. Specifically, the prisms 23q (the inclined surfaces 23r) are formed so as to extend in a substantially perpendicular direction (the B direction) from the light-incident surface

23a as seen in plan view. The length D10 of the prisms 23q in the B direction is preferably 0.5 mm or greater, and more preferably 1 mm or greater, as shown in FIG. 12.

In the first embodiment, the length D10 of the prisms 23q is set so as to be less than the distance D20 of the end area 22b. Specifically, the length is set so as to satisfy the relationship D10<D20.

Each pair of inclined surfaces 23r (each prism 23q) is formed so as to have a predetermined width W14 in the A direction as shown in FIGS. 8 and 10. The width W14 of each pair of inclined surfaces 23r (prism 23q) in the A direction is preferably approximately 0.010 mm (10 μm) to approximately 0.020 mm (20 μm). The incline angle α1 2 of each inclined surface 23r is also preferably approximately 30° to approximately 89°.

Flat surface parts 23p (surfaces on which the prisms 23q are not formed) may be formed between prisms 23q that are adjacent in the A direction. In this case, the flat surface parts 23p are formed so as to have a predetermined width W13 in the A direction. The width W13 of the flat surface parts 23p is preferably 200 μm or less. The end area 22b (near the light entry part) on the LED 21 side of the light-guiding plate 22 can also be configured without flat surface parts 23p. Therefore, the width W13 of the flat surface parts 23p is preferably 0 to 200 μm.

The pitch P12 (=W13+W14) of the prisms 23q in the A direction is preferably P12<W14×2 (W13/W14<1). Specifically, the width W13 of the flat surface parts 23p in the A direction is preferably less than the width W14 of each pair of inclined surfaces 23r in the A direction.

When the light-guiding plate 22 is configured having the light-guiding element 23 and the low-refractive-index layer 24, and is also provided with the prisms 23e, the prisms 23i, the prisms 24b, and the like as described above, bright lines in the shape of Vs (V-shaped bright lines) form readily in areas near the light-incident surface 23a of the light-guiding plate 22 (near the light entry part), as is described hereinafter. When such V-shaped bright lines form, there is a risk decreased illumination quality in areas near the light-incident surface 23a.

The V-shaped bright lines are caused by light spreading in a transverse direction within the light-guiding plate 22, as is described hereinafter. Therefore, collecting the transverse-spreading light in a frontal direction is effective in suppressing the V-shaped bright lines. Linear irregularities are a phenomenon that occurs because there is directivity in the outgoing light from the LEDs 21 and the luminous flux converges the most in the frontal direction. Therefore, linear irregularities are intensified when too much light is collected in the frontal direction. Thus, the V-shaped bright lines and the linear irregularities have a trade-off relationship. Therefore, it is not easy to resolve these two problems simultaneously.

In view of this, in the first embodiment, prisms 23q are formed in the end area 22b on the LED 21 side of the light-guiding element 23 (the light-guiding plate 22) as described above, and these prisms 23q are configured so as to vary the propagation angle of light spreading in the transverse direction (the A direction) much more than the prisms 23i of the light-emitting area 22a. To achieve such a configuration in the first embodiment, the prisms 23q are shaped differently (including dimensions and the like) from the prisms 23i. Specifically, in the first embodiment, the front surface (top surface) of the light-guiding plate 22 has prisms that differ in shape between the end area 22b and the light-emitting area 22a.

The prisms 23q (the inclined surfaces 23r) of the end area 22b are formed so as to reflect light R1 emitted in the directions of the V-shaped bright lines and vary the angular distribution of light in the horizontal direction (transverse direction). Specifically, the prisms 23q (the inclined surfaces 23r) are configured so as to efficiently vary the angle of the light of the V-shaped bright line components (along the arrows R1 in FIGS. 13 and 12) and increase the components of light that do not form V-shaped bright line components (along the arrows R2 in FIGS. 3 and 12). For example, the prisms 23q of the end area 22b reflect the light R1 incident on the light-guiding plate 22 from the LEDs 21 in a direction towards the optical axis O (such that the angle formed with the optical axis O becomes smaller).

The prisms 23i formed in the light-emitting area 22a have less of an effect of varying the propagation angle of transversely spreading light than the prisms 23q of the end area 22b. In other words, the prisms 23i cause light to spread (cause light to diffuse) in a direction intersecting the direction of light entry more so than the prisms 23q. Therefore, the prisms 23i cause light to diffuse appropriately in the light-emitting area 22a, and the occurrence of linear irregularities is suppressed.

For the occurrence of linear irregularities to be suppressed by the prisms 23i of the light-emitting area 22a, the prisms 23i preferably satisfy either of the following conditions (a) and (b).

(a) The incline angle α2 of the inclined surfaces 23j of the prisms 23i is less than the incline angle α12 of the inclined surfaces 23r of the prisms 23q (α2<α12).

(b) The percentage of the prisms 23i occupied by the inclined surfaces 23j (the inclined areas) is less than the percentage of the prisms 23q occupied by the inclined surfaces 23r (the inclined areas) (the percentage occupied by flat surface parts is greater than the prisms 23q) (W3/W4>W13/W14).

Next, the path of light emitted from the LEDs 21 of the backlight unit 20 according to the first embodiment will be described with reference to FIGS. 3, 5, 7, 9, and 12 to 14.

The light emitted from the LEDs 21 has the highest intensity in the frontal direction of the LEDs 21 (the B direction), and has a spread of ±90° in the A and C directions relative to the frontal direction. The light emitted from the LEDs 21 is refracted when incident on the light-incident surface 23a of the light-guiding element 23 (the light-guiding plate 22) as shown in FIG. 5, and the spread in the A and C directions relative to the frontal direction is ±θ1. The angle θ1 is the critical angle between the light-guiding element 23 and the air layer, and θ1=arcsin(1/n1).

Of the light incident on the light-incident surface 23a of the light-guiding element 23, light Q1 traveling toward the light-emitting surface 23b of the light-guiding element 23 travels toward the inclined surfaces 23f of the prisms 23e at an incidence angle of at least θ2 (=90°−θ1−α1), and a large part of this light is fully reflected in the prisms 23e of the light-guiding element 23 (the interface between the light-emitting surface 23b of the light-guiding element 23 and the air layer) toward the rear surface 23c.

Light Q2 fully reflected by the prisms 23e travels toward the rear surface 23c (the low-refractive-index layer 24) at an incidence angle of at least θ3 (=90°−θ1−α1×2). At this time, of the light Q2 traveling toward the rear surface 23c, only light having an incidence angle less than the critical angle between the light-guiding element 23 and the low-refractive-index layer 24 is incident on the low-refractive-index layer 24. Of the light Q2 traveling toward the rear surface 23c, light having an incidence angle of at least the critical angle between the light-guiding element 23 and the low-refractive-index layer 24 is fully reflected in the rear surface 23c of the light-guiding element 23 (the interface between the light-guiding element 23 and the low-refractive-index layer 24) toward the light-emitting surface 23b.

The light Q3 fully reflected by the rear surface 23c travels at an incidence angle of at least θ4 (=90°−θ1−α1×3) toward the inclined surfaces 23f of the prisms 23e, and this light is fully reflected toward the rear surface 23c by the prisms 23e of the light-guiding element 23.

The light Q4 fully reflected by the prisms 23e travels at an incidence angle of at least θ5 (=90°−θ1−α1×4) toward the rear surface 23c (the low-refractive-index layer 24). At this time, of the light Q4 traveling toward the rear surface 23c, only light having an incidence angle less than the critical angle between the light-guiding element 23 and the low-refractive-index layer 24 is incident on the low-refractive-index layer 24. Of the light Q4 traveling toward the rear surface 23c, light having an incidence angle of at least the critical angle between the light-guiding element 23 and the low-refractive-index layer 24 is fully reflected by the rear surface 23c of the light-guiding element 23 toward the light-emitting surface 23b.

Thus, light emitted from the LEDs 21 is repeatedly reflected between the prisms 23e (the light-emitting surface 23b) of the light-guiding element 23 and the rear surface 23c, whereby the light is guided so that the incidence angle relative to the rear surface 23c of the light-guiding element 23 gradually decreases, and the light is incident on the low-refractive-index layer 24.

Light emitted from the LEDs 21 is repeatedly reflected between the prisms 23e of the light-guiding element 23 and the rear surface 23c, whereby the incidence angle relative to the rear surface 23c of the light-guiding element 23 decreases in increments of approximately α1×2. Therefore, the B-directional spread angle of light incident on the low-refractive-index layer 24 is approximately α1×2 or less.

Of the light incident on the light-incident surface 23a of the light-guiding element 23, light Q5 traveling toward the rear surface 23c of the light-guiding element 23 is also incident on the low-refractive-index layer 24 due to being similarly repeatedly reflected between the rear surface 23c of the light-guiding element 23 and the prisms 23e (the light-emitting surface 23b).

Substantially all of the light incident on the low-refractive-index layer 24 is then either fully reflected (refer to the dashed line arrow) forward (toward the liquid crystal display panel 10) in the inclined surfaces 24c of the prisms 24b (the interface between the inclined surfaces 24c of the prisms 24b and the air layer), or fully reflected (refer to the dashed line arrow) after being transmitted through a prism, as shown in FIG. 9. The fully reflected light (refer to the dashed line arrow) is then again incident on the light-guiding element 23, and is emitted forward (toward the liquid crystal display panel 10) from the light-emitting surface 23b (see FIG. 5).

The refractive index (n1) of the light-guiding element 23 is 1.42 or greater (e.g. approximately 1.59 to approximately 1.65), and the refractive index of the air layer is approximately 1. Therefore, the critical angle between the light-guiding element 23 and the air layer is less than the critical angle between the light-guiding element 23 and the low-refractive-index layer 24. Therefore, there is virtually no light emitted from the light-emitting surface 23b that does not pass through the prisms 24b of the low-refractive-index layer 24.

In the first embodiment, because the prisms 23i are formed in the front surface 23b of the light-guiding element 23 as shown in FIG. 7, some of the light traveling toward the front surface 23b of the light-guiding element 23 is diffused (reflected) both ways in the A direction by the inclined surfaces 23j of the prisms 23i.

At this time, observing from the light-incident surface 23a side of the light-guiding element 23, light having a large incidence angle relative to the front surface (top surface) 23b of the light-guiding element 23 is reflected by the inclined surfaces 23j of the prisms 23i, whereby this light has a smaller incidence angle relative to the rear surface 23c of the light-guiding element 23.

Light from the LEDs 21 is incident on the low-refractive-index layer 24 as described above while being diffused in the A direction.

Of the light from the LEDs 21 incident from the light-incident surface 23a, light R1 emitted in the directions of the V-shaped bright lines is reflected by the prisms 23q (the inclined surfaces 23r) of the end area 22b as shown in FIGS. 3 and 12, and the light-guiding angle (the propagation angle) varies. Specifically, incident light from the light-incident surface 23a is reflected by the prisms 23q (the inclined surfaces 23r) in a direction toward the optical axis O (such that the angle formed with the optical axis O decreases). Therefore, light R1 having an angular distribution causing V-shaped bright lines (light constituting the V-shaped bright line components) is varied to light R2 having an angular distribution that does not cause V-shaped bright lines (light not constituting the V-shaped bright line components). The incident light from the light-incident surface 23a thereby becomes light not constituting the V-shaped bright line components and propagates through the light-guiding plate 22. Therefore, the occurrence of V-shaped bright lines is suppressed.

Figure 13:
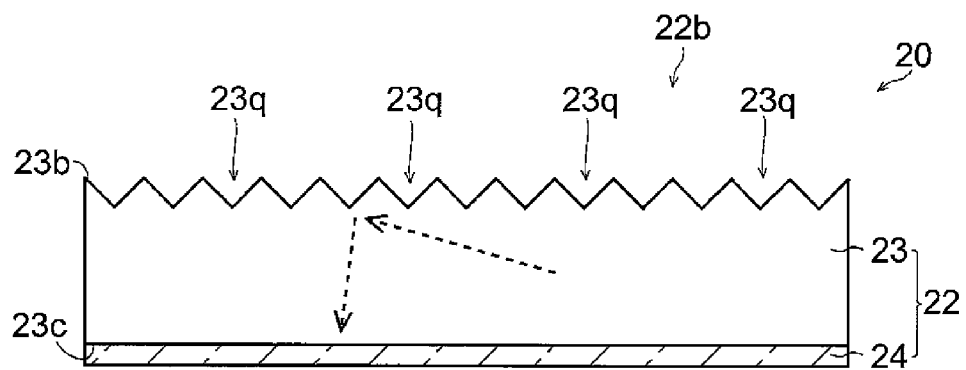
FIG. 13 is a cross-sectional view schematically depicting the light-guiding plate of the backlight unit according to the first embodiment of the present invention (a drawing for describing light reflection in the end area)
Figure 14:
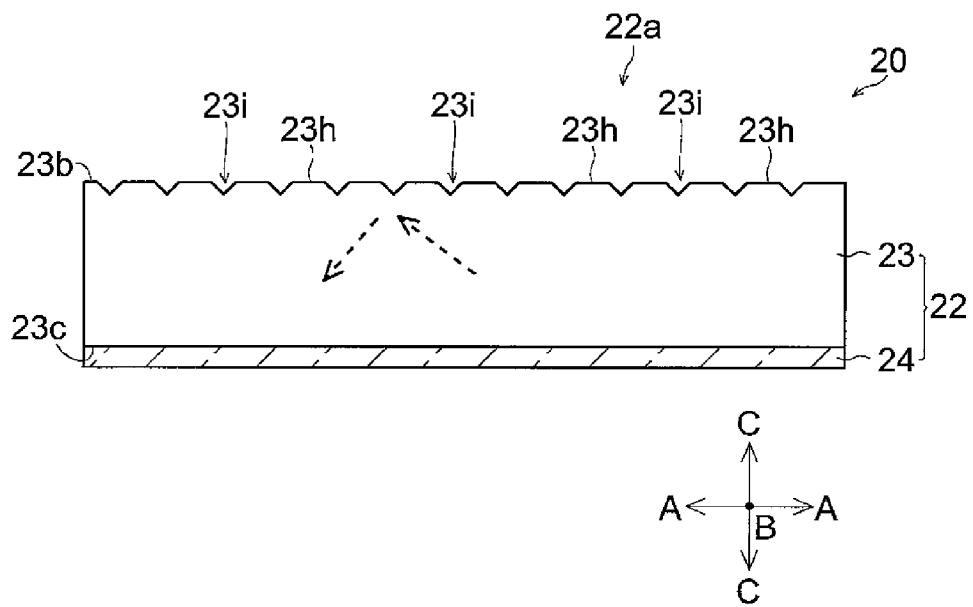
FIG. 14 is a cross-sectional view schematically depicting the light-guiding plate of the backlight unit according to the first embodiment of the present invention (a drawing for describing light reflection in the light-emitting area)

In the end area 22b of the light-guiding plate 22 (the light-guiding element 23), the transverse spread of light (in the A direction, for example) is suppressed by the prisms 23q as shown in FIG. 13 (refer to the dashed line arrows in FIG. 13). Because prisms 23i having less of an effect of suppressing light spreading than the prisms 23q are also formed in the light-emitting area 22a as shown in FIG. 14, light is appropriately diffused in the light-emitting area 22a (refer to the dashed line arrows in FIG. 14). The occurrence of linear irregularities is thereby suppressed.

Next is a detailed description, referring to FIGS. 21 to 26, of the reasons for suppressing the A-directional spreading of light emitted from the light-guiding plate 22.

Figure 21:
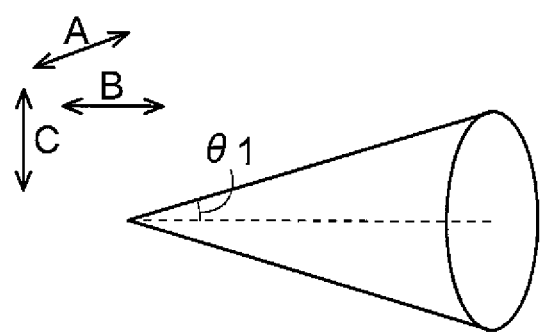
FIG. 21 is a perspective view for describing the spreading of light incident on the light-guiding element of the backlight unit according to the first embodiment of the present invention.

Light emitted from the LEDs 21 has a spread of ±90° in the A and C directions relative to the frontal direction of the LEDs 21 (the B direction). The light emitted from the LEDs 21 is refracted when incident on the light-incident surface 23a of the light-guiding element 23, and the spread in the A and C directions relative to the B direction is ±θ1 as shown in FIG. 21. The angle θ1 is the critical angle between the light-guiding element 23 and the air layer.

When the light in the light-guiding element 23 is in the range of an angle θ in the A and C directions relative to the B direction, the following relationship (1) is established.

$$\theta \leq \theta 1 = \arcsin(1/n1) \quad (1)$$

Using φ to denote the critical angle between the light-guiding element 23 and the low-refractive-index layer 24, it is possible for only light in an area satisfying the following relationship (2) to be incident on the low-refractive-index layer 24.

$$\pi/2 - \theta < \phi = \arcsin(n2/n1) \quad (2)$$

Figure 22:
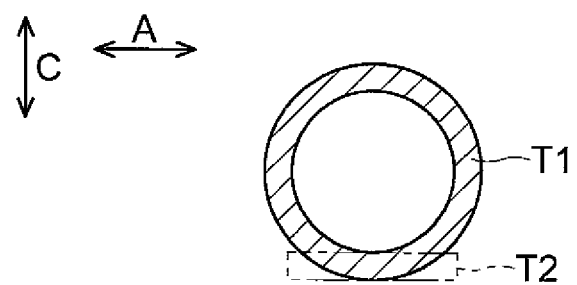
FIG. 22 is a view from the LED side of the light incident on the light-guiding element of the backlight unit according to the first embodiment of the present invention.

When this area is illustrated, it is the area T1 (the hatching area) in FIG. 22. As is described hereinafter, of the light that had just been incident on the light-guiding element 23, only the light of the area T2 in FIG. 22 can actually be incident on the low-refractive-index layer 24. The reason for this is described below.

Using $\theta_C$ to denote the C-directional spreading component of light incident on the light-guiding element 23, the incidence angle of light on the low-refractive-index layer 24 is $\pi/2-\theta_C$. The conditions for light being incident on the low-refractive-index layer 24 is $\pi/2-\theta_C<\phi$ and $0<\pi/2-\theta_C<90$, therefore resulting in the following relationship (3).

$$\cos(\pi/2-\theta_C)=\sin\theta_C>\cos\phi \qquad (3)$$

Figure 23:
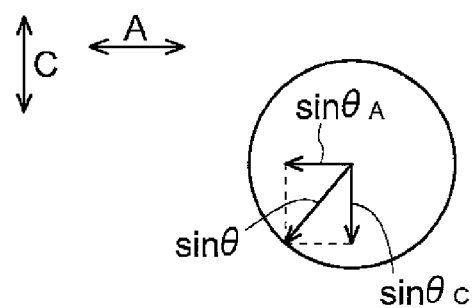
FIG. 23 is a view from the LED side of light incident on the low-refractive-index layer from among the light incident on the light-guiding element of the backlight unit according to the first embodiment of the present invention.

Using $\theta_A$ to denote the A-directional spreading component of light incident on the light-guiding element 23, $\theta_A$ satisfies the following relationship (4), from FIG. 23.

$$\sin^2\theta_A=\sin^2\theta-\sin^2\theta_C \qquad (4)$$

Because $\sin\theta\leq\sin\theta1$ and $\cos\phi<\sin\theta_C\leq\sin\theta1$ in the above relationships (1) and (3), the following relationship (5) is derived using the above relationship (4).

$$0\leq\sin^2\theta_A<\sin^2\theta1-\cos^2\phi \qquad (5)$$

For example, if n1=1.59 and n2=1.35, the range taken by $\theta_A$ is $0\leq\theta_A<19.95$, and A-directional light spreading can be suppressed. The effect of suppressing A-directional light spreading is slightly weakened by the prisms 23$i$, but because the width W3 of the flat surface parts 23$h$ in the A direction is equal to or less than the width W4 of the prisms 23$i$ in the A direction, most of the effect of suppressing A-directional light spreading can be maintained by increasing the incidence angle of the prisms 23$i$ (reducing the vertical angle).

Figure 24:
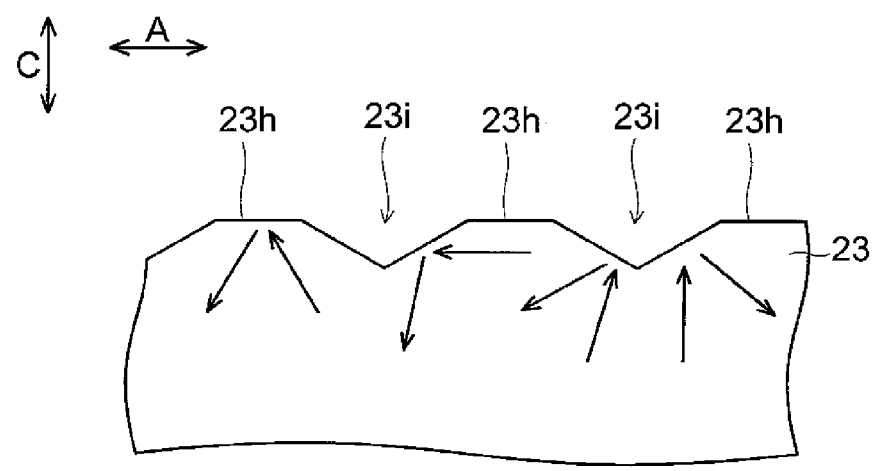
FIG. 24 is a diagram showing light reflected by the flat surface parts 23h and prisms 23i of the light-guiding element of the backlight unit according to the first embodiment of the present invention.
Figure 25:
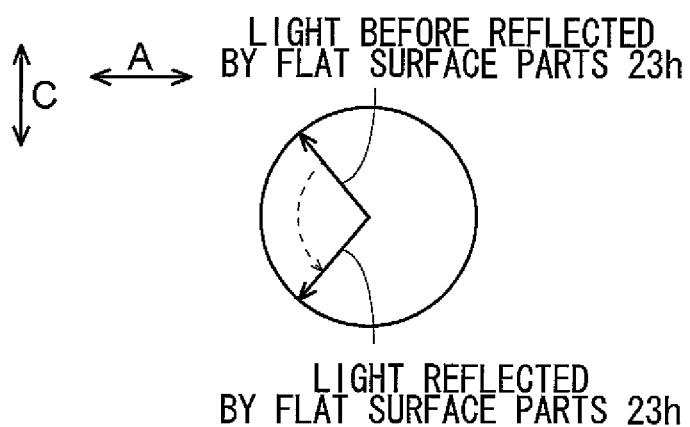
FIG. 25 is a diagram showing light reflected by the flat surface parts 23h of the light-guiding element of the backlight unit according to the first embodiment of the present invention.
Figure 26:
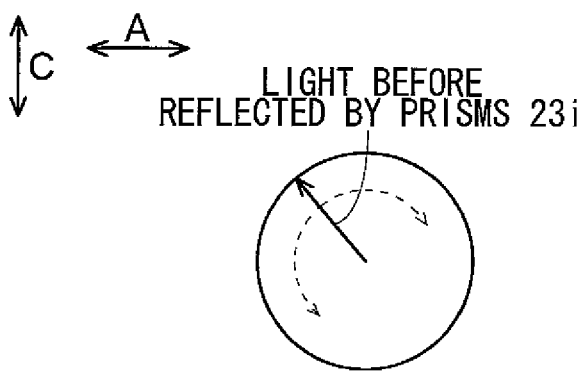
FIG. 26 is a diagram showing light reflected by the prisms 23i of the light-guiding element of the backlight unit according to the first embodiment of the present invention.

The effect of the flat surface parts 23$h$ and the prisms 23$i$ is further described. Light reflected by the flat surface parts 23$h$ of the light-guiding element 23 changes direction to the C direction while maintaining the spread in the B and A directions as shown in FIGS. 24 and 25. Light reflected by the prisms 23$i$ of the light-guiding element 23 varies in terms of the C-directional and A-directional spreading components while maintaining the spread in the B direction, as shown in FIGS. 24 and 26.

Therefore, it is possible to keep the spreading of light in the C and A directions from becoming very disproportionate in the light-guiding element 23. Specifically, because the spreading of light in the C and A directions is continually varied in the light-guiding element 23 by the prisms 23$i$, the C- and A-directional components can be made equal.

Light in the area T1 (see FIG. 22) that satisfies the above relationship (2) is thereby varied by the prisms 23$i$ in terms of the C- and A-directional spreading components, whereby light is incident on the low-refractive-index layer 24 when the above relationship (3) is satisfied. As a result, light suppressed from spreading in the A direction can be emitted uniformly from the light-guiding plate 22.

Next is a description, referring to FIGS. 3 to 8 and 15 to 20, of the V-shaped bright lines forming near the light-incident surface of the light-guiding plate 22.

Figure 15:
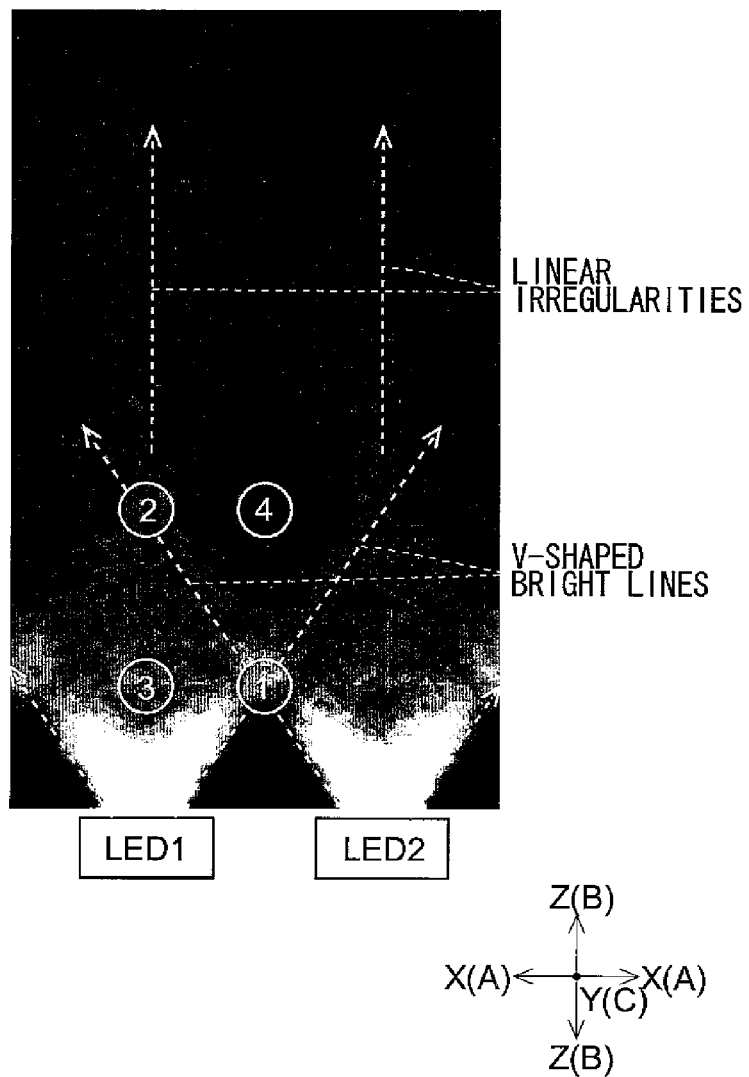
FIG. 15 is a diagram showing V-shaped bright lines and linear irregularities.

When the light-guiding plate 22 (see FIG. 4) is configured having the light-guiding element 23 and the low-refractive-index layer 24, and is provided with the prisms 23$e$, the prisms 23$i$, the prisms 24$b$, and the like as described above, V-shaped bright lines form readily near the light-incident surface of the light-guiding plate 22 as shown in FIG. 15. Therefore, the inventors of the present invention have conducted various investigations into the causes of these V-shaped bright lines.

First, a simulation was used to determine which light angles, of the full angular distribution of light emitted from the LEDs (the light source), were affecting the V-shaped bright lines. The results are shown in FIG. 16. FIG. 16 is a diagram showing the angular distributions of light in the areas of FIG. 15. Area "1" is positioned in the V-shaped bright line components of the LED 1 and the LED 2, and area "2" is positioned in the V-shaped bright line component of the LED 2. Area "3" and area "4" are positioned in areas separated from the V-shaped bright lines. The letters (a) through (d) in FIG. 16 show angular distributions of light from the LED 1, and the letters (e) through (h) in FIG. 16 show angular distributions of light from the LED 2.

In area "1" positioned in V-shaped bright line components in FIG. 16, light intensity of angles in transverse portions (those enclosed by dashed lines) was found to be high in both the LED 1 (FIG. 16($a$)) and the LED 2 (FIG. 16($e$)), and this light was observed as V-shaped bright lines. Because area "2" is positioned in the V-shaped bright line portion of the LED 2, high light intensity of angles in transverse portions (those enclosed by dashed lines) was observed in the LED 2 (FIG. 16($f$)). In area "3" and area "4" not positioned in V-shaped bright line components, high light intensity was not observed in angles in transverse portions, and substantially the same light intensity was observed in all angular distributions. Light resulting in V-shaped bright lines was thereby observed to concentrate in the transverse portions of the circumference (angles in transverse portions).

As described above, the V-shaped bright lines are caused by factors such as the angular distribution of incident light, and light of angles in transverse portions was observed to become V-shaped bright lines. This is believed to be because light of angles in transverse portions is emitted forward from the light-emitting surface 23$b$ (see FIG. 4) in areas near the light-incident surface 23$a$. Specifically, due to factors such as the surface roughness of the light-incident surface 23$a$ of the light-guiding plate 22, and the effects of the prisms 23$e$ (see FIG. 6) and the prisms 23$i$ (see FIG. 7) formed in the light-emitting surface 23$b$, in areas near the light-incident surface 23$a$, light of angles in transverse portions has an incidence angle relative to the rear surface 23$c$ of the light-guiding element 23 which is equal to or less than the critical angle between the light-guiding element 23 and the low-refractive-index layer 24. This light is thereby incident on the low-refractive-index layer 24 and is reflected forward by the prisms 24$b$ (see FIG. 5). The light is then emitted forward from the light-emitting surface 23$b$. This light is believed to become V-shaped bright lines in areas near the light-incident surface 23$a$. Specifically, V-shaped bright lines are believed to occur due to the light not fully reflected by the interface with the low-refractive-index layer 24 leaking out forward.

Figure 17:
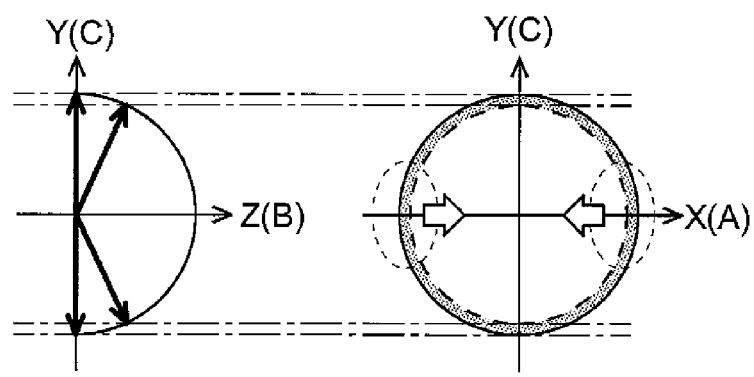
FIG. 17 is a diagram showing outgoing light angular distributions from an LED.

Specifically, of the light emitted at an angle $\theta1$ from the LEDs (e.g. an angle in a range of 65° to 90°), for example, light in the transverse portions of the circumference (light in the portions enclosed by the dashed lines in the hatching areas) becomes V-shaped bright lines as shown in FIG. 17.

When prisms 23$q$ (inclined surfaces 23$r$) are formed in the end area 22$b$ of the light-guiding plate 22 as shown in FIG. 3, light of angles in transverse portions is reflected by these prisms 23$q$ (inclined surfaces 23$r$), and the angular distribution is changed. Incidence on the low-refractive-index layer 24 is thereby suppressed (the light is fully reflected by the interface with the low-refractive-index layer 24), and light leakage from the light-emitting surface 23$b$ is suppressed. As a result, the occurrence of V-shaped bright lines is suppressed.

Figure 18A:
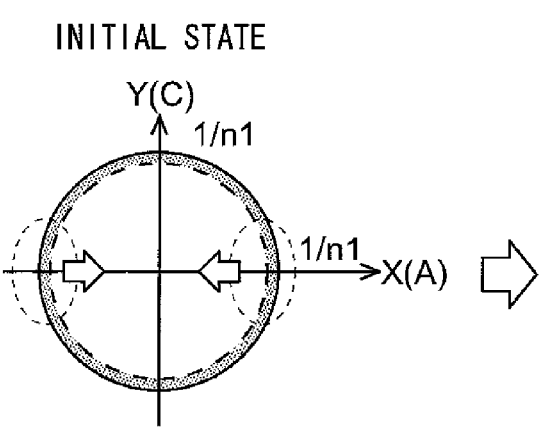
FIG. 18 is a diagram showing angular distributions of light within the light-guiding plate.
Figure 18B:
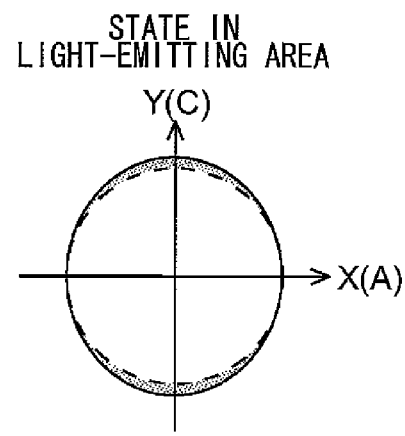

FIG. 18 shows the angular distribution in the light-guiding plate. FIG. 18(A) shows a state (the initial state) before the light in the transverse portions of the circumference is reflected by the prisms 23$q$ (inclined surfaces 23$r$), and FIG. 18(B) shows a state (the state in the light-emitting area) after the light in the transverse portions of the circumference has been reflected by the prisms 23q (inclined surfaces 23r). The angular distribution of the light in the transverse portions of the circumference changes due to this light being reflected by the prisms 23q (inclined surfaces 23r) (see FIG. 3) as shown in FIG. 18. The incidence angle, relative to the rear surface 23c (see FIG. 5), of light of angles in transverse portions is thereby greater in the critical angle between the light-guiding element 23 and the low-refractive-index layer 24. Therefore, forward reflection by the prisms 24b (see FIG. 5) is suppressed in areas near the light-incident surface 23a. As a result, the occurrence of V-shaped bright lines is suppressed. Thus, V-shaped bright lines are prevented and light is effectively utilized by forming prisms 23q (inclined surfaces 23r) (see FIGS. 3 and 8) in the end area 22b, because light of angular distributions that cause V-shaped bright lines is reflected by the prisms 23q (inclined surfaces 23r) and changed to angular distributions that do not cause V-shaped bright lines.

Figure 19:
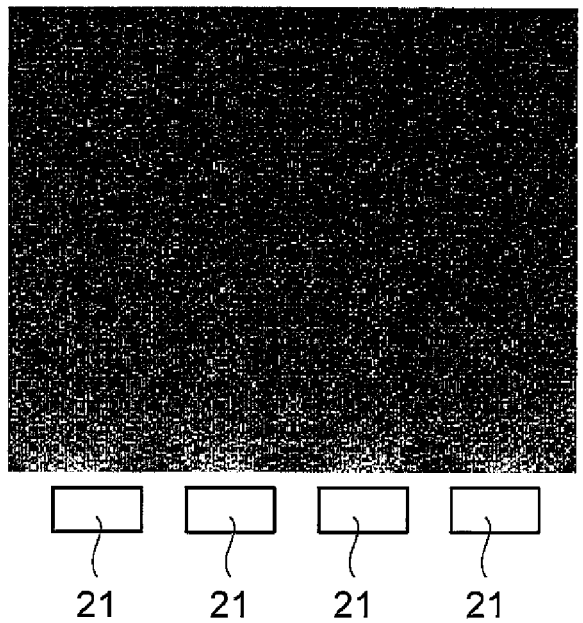
FIG. 19 is a diagram resulting from a simulation of outgoing light (planar light) from the backlight unit according to a working example.
Figure 20:
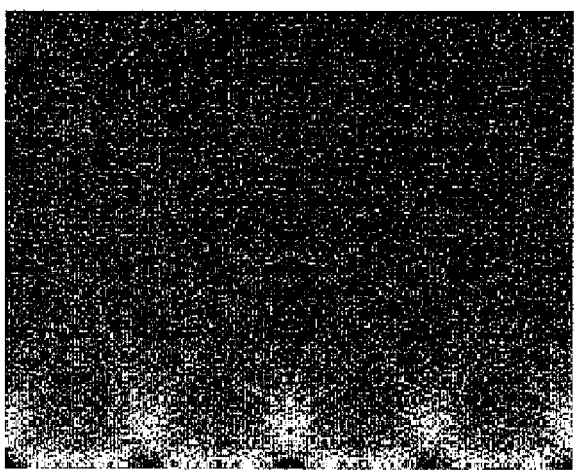
FIG. 20 is a diagram resulting from a simulation of outgoing light (planar light) from the backlight unit according to a comparative example.

Next, the V-shaped bright line suppression effect of the prisms 23q (inclined surfaces 23r) (see FIG. 3) was confirmed through a simulation. In this simulation, a configuration similar to the first embodiment (a configuration having prisms 23q) was a working example, and a configuration similar to the working example except for not having prisms 23q was a comparative example. The results are shown in FIGS. 19 and 20. In the working example having prisms 23q (see FIG. 3) as shown in FIG. 19, V-shaped bright lines were not observed, and high-quality planar light free of brightness irregularities was confirmed. In the comparative example shown in FIG. 20, V-shaped bright lines were observed, and the results were that brightness irregularities occurred due the V-shaped bright lines. It was thereby confirmed that providing prisms 23q (see FIG. 3) to the end area 22b of the light-guiding plate caused the occurrence of V-shaped bright lines to be suppressed and brightness irregularities to be suppressed. The prisms 23i of the light-emitting surface 23b are configured so as to diffuse light appropriately in a different manner from the prisms 23q of the end area 22b, as shown in FIG. 3. Therefore, the suppression of not only V-shaped bright lines but also the occurrence of linear irregularities was confirmed, as shown in FIG. 19.

FIGS. 27 to 32 are drawings for describing the steps of manufacturing the light-guiding plate of the backlight unit according to the first embodiment. Next is a description, referring to FIGS. 27 to 32, of the method for manufacturing the light-guiding plate 22 of the backlight unit 20 according to the first embodiment.

Figure 27:
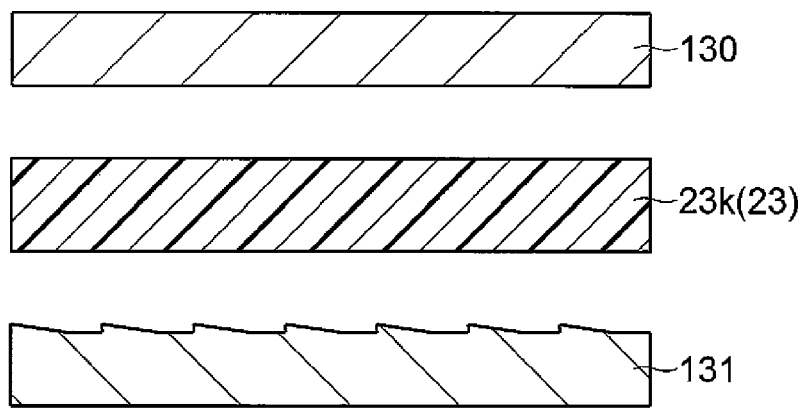
FIG. 27 is a cross-sectional view for describing a step of manufacturing the light-guiding plate of the backlight unit according to the first embodiment of the present invention.
Figure 28:
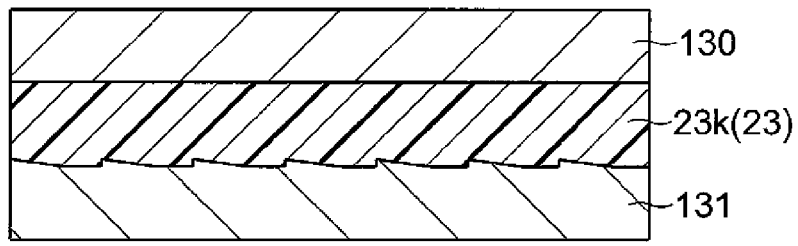
FIG. 28 is a cross-sectional view for describing a step of manufacturing the light-guiding plate of the backlight unit according to the first embodiment of the present invention.

First, the light-guiding element 23 is formed using an imprint from heat. Specifically a film material 23k composed of a transparent resin is disposed between a top mold 130 and a bottom mold 131, as shown in FIG. 27. Next, the film material 23k is heated and pressurized by the top mold 130 and the bottom mold 131 as shown in FIG. 28. The film material 23k is thereby formed into the desired shape.

Figure 29:
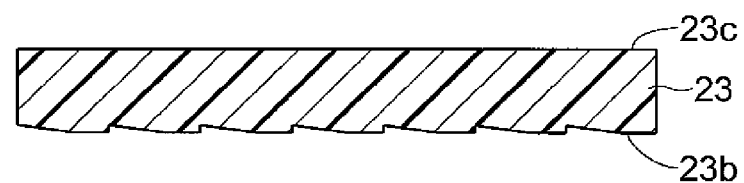
FIG. 29 is a cross-sectional view for describing a step of manufacturing the light-guiding plate of the backlight unit according to the first embodiment of the present invention.

The film material 23k is separated from the top mold 130 and the bottom mold 131, cooled, and divided into individual pieces, thereby obtaining the light-guiding element 23 as shown in FIG. 29.

The light-guiding element 23 can also be formed by injection molding rather than imprinting, but the light-guiding element 23 can be manufactured by a roll-to-roll system by forming the light-guiding element 23 by imprinting using the film material 23k. Manufacturing time can thereby be shortened, and manufacturing costs can be reduced.

Figure 30:
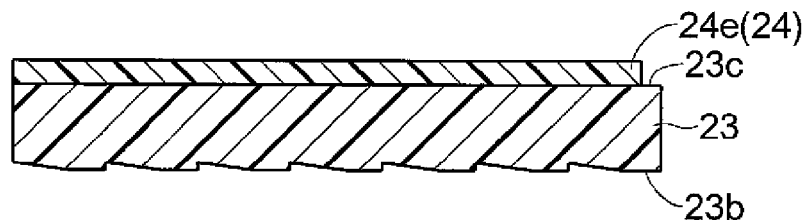
FIG. 30 is a cross-sectional view for describing a step of manufacturing the light-guiding plate of the backlight unit according to the first embodiment of the present invention.

Next, the low-refractive-index layer 24 is formed on the rear surface 23c of the light-guiding element 23, using imprinting with UV light (ultraviolet rays). Specifically, the rear surface 23c of the light-guiding element 23 is coated with a UV-curable resin 24e composed of a transparent resin, as shown in FIG. 30. At this time, the UV-curable resin 24e can be applied as a coating in a uniform film thickness because the light-guiding element 23 is formed substantially parallel with the light-emitting surface 23b and the rear surface 23c.

Figure 31:
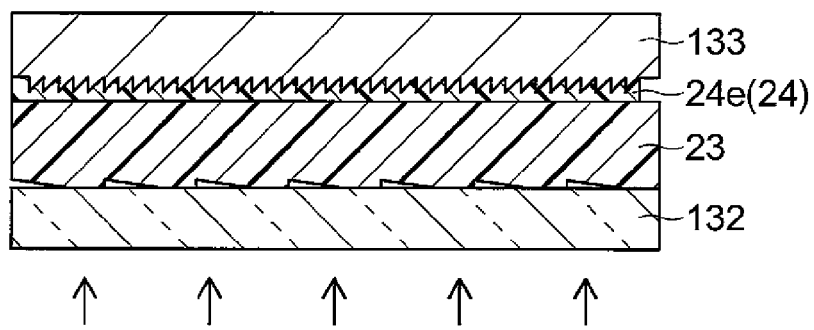
FIG. 31 is a cross-sectional view for describing a step of manufacturing the light-guiding plate of the backlight unit according to the first embodiment of the present invention.
Figure 32:
FIG. 32 is a cross-sectional view for describing a step of manufacturing the light-guiding plate of the backlight unit according to the first embodiment of the present invention.

The light-guiding element 23 and the UV-curable resin 24e are disposed on a quartz substrate 132, and the light-guiding element 23 and the UV-curable resin 24e are sandwiched by the quartz substrate 132 and a mold 133, as shown in FIG. 31. The UV-curable resin 24e is then cured to form the low-refractive-index layer 24 by shining UV light from the side having the quartz substrate 132. A light-guiding plate 22 having the desired shape and composed of the light-guiding element 23 and the low-refractive-index layer 24 is thereby obtained as shown in FIG. 32.

A roll-to-roll system may be used until the low-refractive-index layer 24 is formed, after which the light-guiding plate 22 (the light-guiding element 23 and the low-refractive-index layer 24) may be divided into individual pieces.

In the first embodiment, the light-emitting surface 23b of the light-guiding element 23 is provided with a plurality of prisms 23e for gradually reducing the incidence angle of light from the LEDs 21 relative to the rear surface 23c of the light-guiding element 23, whereby the light from the LEDs 21 is guided while being repeatedly reflected between the light-emitting surface 23b and the rear surface 23c of the light-guiding element 23, and the incidence angle of light relative to the rear surface 23c of the light-guiding element 23 gradually decreases. When the incidence angle of light relative to the rear surface 23c of the light-guiding element 23 is less than the critical angle between the light-guiding element 23 and the low-refractive-index layer 24, the light from the LEDs 21 is incident on the low-refractive-index layer 24. Therefore, there is a smaller B-directional spreading angle of light incident on the low-refractive-index layer 24, and there is a smaller B-directional spreading angle of light reflected in the interface between the rear surface 24a of the low-refractive-index layer 24 and the air layer. Specifically, the light-collecting characteristic can be improved, and the brightness of the liquid crystal display panel 10 can be improved. As a result, there is no need to provide a plurality of optical sheets such as collecting lenses on the light-guiding plate 22, the backlight unit 20 can therefore be thinned, and the increase in manufacturing costs can be suppressed.

Because there is no need to provide a plurality of optical sheets, there is no light loss when light passes through optical sheets (there is no light loss due to multiple reflection between the sheets, for example). Light utilization efficiency can thereby be improved.

Due to a plurality of prisms 23e being provided for gradually reducing the incidence angle of light relative to the rear surface 23c of the light-guiding element 23, light from the LEDs 21 is guided while being repeatedly reflected between the light-emitting surface 23b and the rear surface 23c of the light-guiding element 23, and as the light gets further away from the LEDs 21, the incidence angle relative to the rear surface 23c of the light-guiding element 23 decreases and the light is more readily incident on the low-refractive-index layer 24. The quantity of light incident on the low-refractive-index layer 24 can thereby be made uniform in portions near the LEDs 21 and greater in light quantity (luminous flux) and portions far from the LEDs 21 and lesser in light quantity (luminous flux). As a result, light can be emitted uniformly from the entire light-emitting area 22a of the light-guiding plate 22, and the brightness of the liquid crystal display panel 10 therefore can be made uniform.

In the first embodiment, due to a plurality of prisms 24b for reflecting light from the LEDs 21 forward being formed in substantially the entire rear surface 24a of the low-refractive-index layer 24 in the light-emitting area 22a of the light-guiding plate 22, the light can be uniformly reflected by the plurality of prisms 24b in substantially the entire light-emitting area 22a of the light-guiding plate 22. Light can thereby be emitted more uniformly from the entire light-emitting area 22a of the light-guiding plate 22, the occurrence of dot irregularities can therefore be suppressed, and the brightness of the liquid crystal display panel 10 can be made more uniform.

In the first embodiment, because the plurality of prisms 24b have the function of fully reflecting light from the LEDs 21, the light incident on the low-refractive-index layer 24 from the light-guiding element 23 can be suppressed from being emitted from the rear surface 24a of the low-refractive-index layer 24. Light loss can thereby be suppressed, and light utilization efficiency can be further improved.

In the first embodiment, light from the LEDs 21 incident on the light-guiding element 23 can be reflected by the prisms 23q, due to the prisms 23q being formed on the end area 22b on the LED 21 side of the light-guiding element 23. The prisms 23q can vary the propagation angle of light spreading in the transverse direction much more than the prisms 23i. Therefore, the spreading of light in the transverse direction can be suppressed by the prisms 23q. The V-shaped bright lines are caused by light spreading in the transverse direction within the light-guiding element 23. Therefore, the occurrence of V-shaped bright lines can be effectively suppressed due to the spreading of light in the transverse direction being suppressed by the prisms 23q. The light that causes V-shaped bright lines can be effectively utilized by suppressing the occurrence of V-shaped bright lines, and light utilization efficiency and brightness can therefore be effectively improved.

The prisms 23i formed in the light-emitting area 22a of the light-guiding element 23 are configured so as to have less of an effect than the prisms 23q of varying the propagation angle of light spreading in the transverse direction, whereby light can be appropriately diffused by the prisms 23i in the light-emitting area 22a. The occurrence of linear irregularities can thereby be suppressed.

Thus, in the first embodiment, the occurrence of V-shaped bright lines and linear irregularities can be effectively suppressed by forming the prisms 23q in the end area of the light-guiding element 23 (near the light entry part) and forming the prisms 23i in the light-emitting area 22a. Therefore, planar light of more satisfactory uniformity can be achieved because brightness irregularity can be effectively improved. Specifically, the occurrence of brightness irregularities caused by V-shaped bright lines and linear irregularities can be effectively suppressed in the planar light emitted from the backlight unit 20. As a result, a backlight unit 20 having highly uniform brightness can be obtained. Light that causes V-shaped bright lines and linear irregularities can also be effectively utilized, and light utilization efficiency and brightness can therefore be effectively improved.

Because the prisms 23q of the end area 22b reflect light incident on the light-guiding element 23 in a direction toward the optical axis O of the light from the LEDs 21, the light of components that cause V-shaped bright lines can be effectively changed to light of components that do not cause V-shaped bright lines. The occurrence of V-shaped bright lines can thereby be effectively suppressed, and the occurrence of brightness irregularities caused by V-shaped bright lines can therefore be effectively suppressed in the planar light emitted from the backlight unit 20.

A configuration in which the propagation angle of light spreading in the transverse direction is varied by the prisms 23q and the prisms 23i can be easily achieved by giving the prisms 23q and the prisms 23i different shapes.

Due to the prisms 23q (inclined surfaces 23r) being formed so as to extend in a substantially orthogonal direction (the B direction) from the light-incident surface 23a as seen in plan view, light incident on (entering) the light-guiding element 23 is reflected by the inclined surfaces 23r (the prisms 23q), whereby the propagation angle of light spreading in the transverse direction can be easily varied. The occurrence of V-shaped bright lines can thereby be easily suppressed. Due to the prisms 23i (the inclined surfaces 23j) are formed so as to extend in a substantially orthogonal direction (the B direction) relative to the light-incident surface 23a as seen in plan view, light is reflected by the inclined surfaces 23j (the prisms 23i), whereby the light can be appropriately diffused. The occurrence of linear irregularities can thereby be suppressed more effectively.

In the first embodiment, the light-emitting surface 23b and the rear surface 23c of the light-guiding element 23 are formed substantially parallel to each other, whereby the low-refractive-index layer 24 can be formed on the rear surface 23c of the light-guiding element 23 more easily than in cases of using a wedge-shaped light-guiding element in which the rear surface is inclined relative to the light-emitting surface, for example.

In the first embodiment, the prisms 23e are provided with inclined surfaces 23f that are inclined relative to the light-emitting surface 23b of the light-guiding element 23, whereby the incidence angle of light from the LEDs 21 relative to the rear surface 23c of the light-guiding element 23 can be gradually reduced easily.

In the first embodiment, light is repeatedly reflected between the prisms 23e and the rear surface 23c due to the inclined surfaces 23f being inclined by 5° or less (0.1° or more and 3° or less) relative to the light-emitting surface 23b of the light-guiding element 23, whereby the incidence angle of light relative to the rear surface 23c of the light-guiding element 23 decreases in increments of 10° or less (0.2° or more and 6° or less). The incidence angle of light relative to the rear surface 23c of the light-guiding element 23 thereby can be gradually reduced more easily.

In the first embodiment, the dispersing of light emitted from the light-guiding element 23 can be suppressed by forming flat surface parts 23d between prisms 23e that are adjacent in the B direction.

In the first embodiment, because light can be more uniformly reflected by the plurality of prisms 24b due to the plurality of prisms 24b being formed continuously without breaks in the B direction, light can be emitted more uniformly from the entire light-emitting area 22a of the light-guiding plate 22. The brightness of the liquid crystal display panel 10 can thereby be made more uniform.

In the first embodiment, because light can be more uniformly reflected by the plurality of prisms 24b due to the plurality of prisms 24b being formed having the same shape and size as each other, light can be emitted more uniformly from the entire light-emitting area 22a of the light-guiding plate 22.

In the first embodiment, light can be appropriately diffused in the A direction within the light-guiding element 23 due to the plurality of prisms 23i for diffusing light from the LEDs 21 in the A direction being formed in the light-emitting surface 23b of the light-guiding element 23 (the light-emitting area 22a), and the brightness of the frontal portions of the LEDs 21 of the liquid crystal display panel 10 can therefore be made more uniform, as can the brightness of portions other than the frontal portions of the LEDs 21 of the liquid crystal display panel 10. Specifically, the brightness of the liquid crystal display panel 10 can be made more uniform. The occurrence of linear irregularities can also be suppressed by forming such prisms 23i, and brightness irregularities can therefore be effectively suppressed.

Due to the plurality of prisms 23i for diffusing light from the LEDs 21 in the A direction being formed, light having a large incidence angle relative to the rear surface 23c of the light-guiding element 23 is reflected by the prisms 23i as seen from the light-incident surface 23a side of the light-guiding element 23, whereby the incidence angle relative to the rear surface 23c of the light-guiding element 23 can be reduced. The A-directional spreading of light incident on the low-refractive-index layer 24 can thereby be suppressed, and A-directional spreading of light emitted from the light-guiding plate 22 can therefore be suppressed. As a result, the characteristic of collecting light in the A direction can be improved, and the brightness of the liquid crystal display panel 10 can be further improved.

In the first embodiment, the brightness of the liquid crystal display panel 10 can be made more uniform, because light from the LEDs 21 can be diffused both ways in the A direction by each pair of inclined surfaces 23j due to each prism 23i being formed by a pair of inclined surfaces 23j.

When the LEDs 21 are used as a light source, the brightness of the frontal portions of the LEDs 21 of the liquid crystal display panel 10 and the brightness of portions other than the frontal portions of the LEDs 21 of the liquid crystal display panel 10 are likely to be difference, and it is therefore particularly effective to provide a plurality of prisms 23i for diffusing the light from the LEDs 21 in the A direction as described above.

By providing such a backlight unit 20, a liquid crystal display device 1 having high display quality and suppressed brightness irregularities can be easily obtained.

Figure 33:
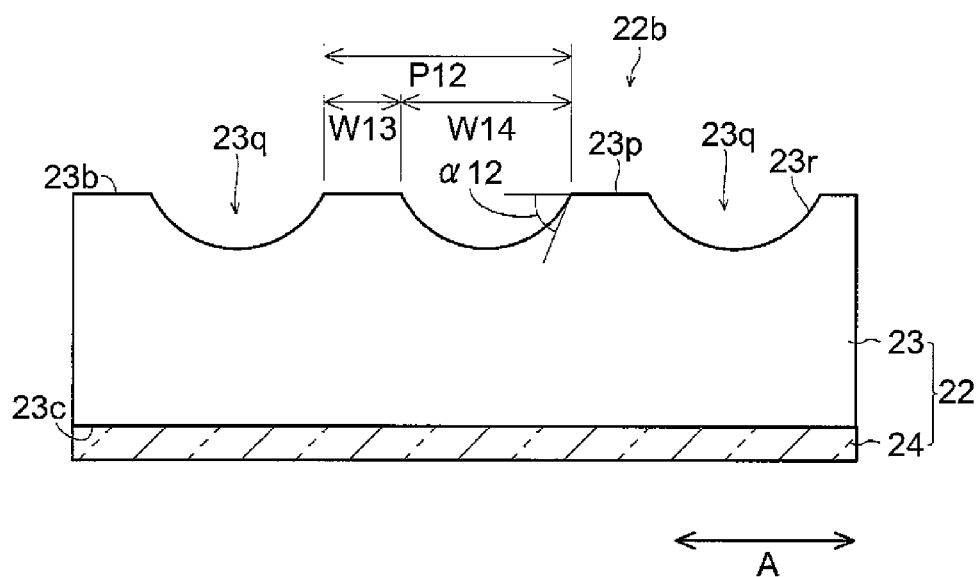
FIG. 33 is a drawing corresponding to the cross section along line α1-α1 in FIG. 3 (a drawing showing another example)
Figure 34:
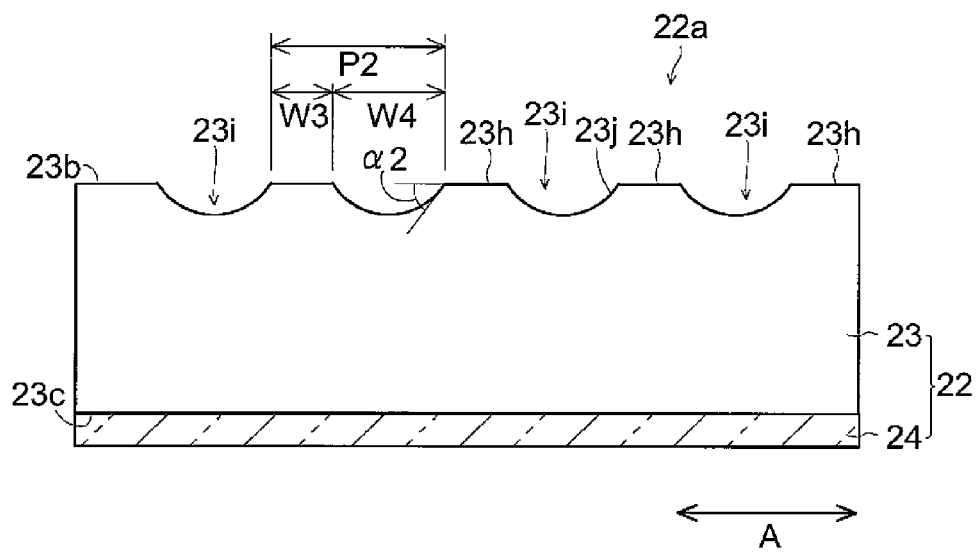
FIG. 34 is a drawing corresponding to the cross section along line α2-α2 in FIG. 3 (a drawing showing another example)

In the above embodiment, an example was presented in which the prisms 23q of the end area 22b and the prisms 23i of the light-emitting area 22a are formed so that their cross sections are triangular shapes. However, the shapes of prisms 23q and 23i may be shapes other than cross-sectional triangles. If the prisms 23q and 23i have inclined surfaces capable of reflecting light and varying the light-guiding angle, the shapes thereof are not particularly limited. For example, the prisms 23q of the end area 22b may be formed so as to have arcuate cross sections (so as to have curved inclined surfaces) as shown in FIG. 33. Similarly, the prisms 23i of the light-emitting area 22a may be formed so as to have arcuate cross sections as shown in FIG. 34. FIG. 33 corresponds to FIG. 10 described above, and FIG. 34 corresponds to FIG. 11 described above.

Second Embodiment

Figure 35:
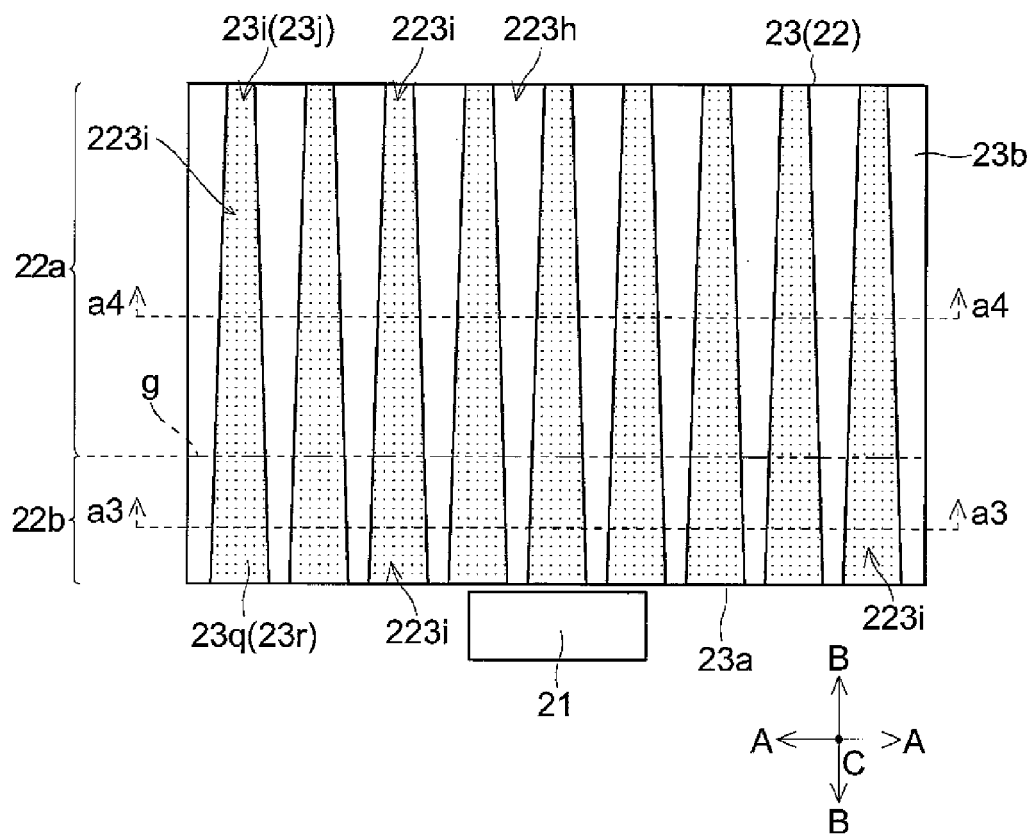
FIG. 35 is a plan view schematically depicting part of a backlight unit according to a second embodiment of the present invention.
Figure 36:
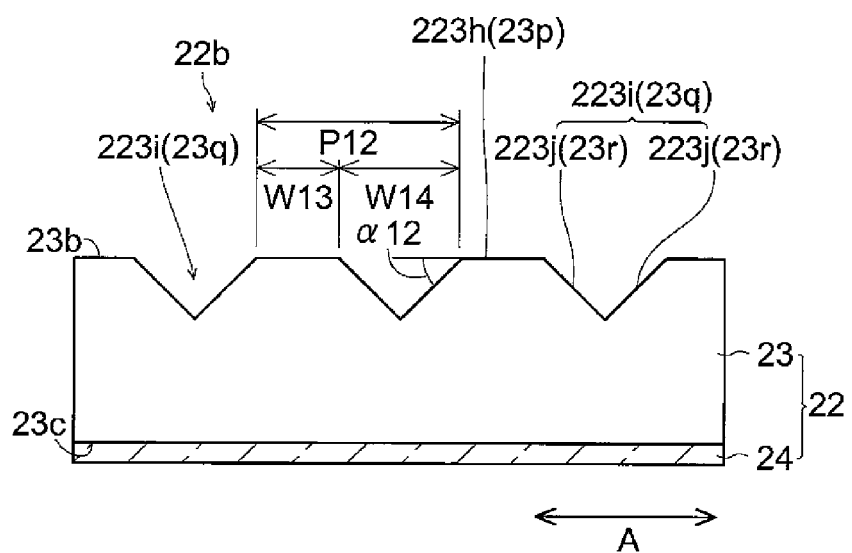
FIG. 36 is a cross-sectional view along line a3-a3 in FIG. 35.
Figure 37:
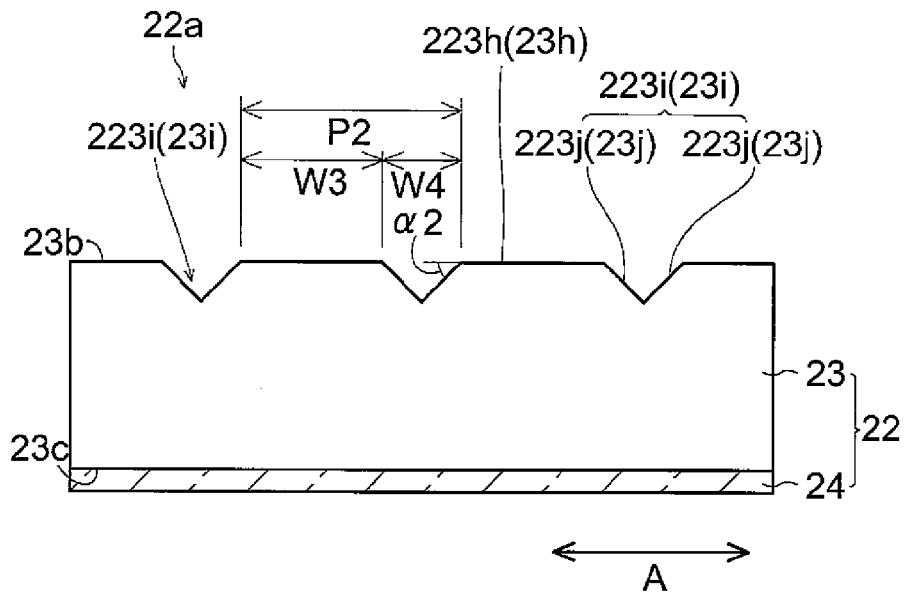
FIG. 37 is a cross-sectional view along line a4-a4 in FIG. 35.
Figure 38:
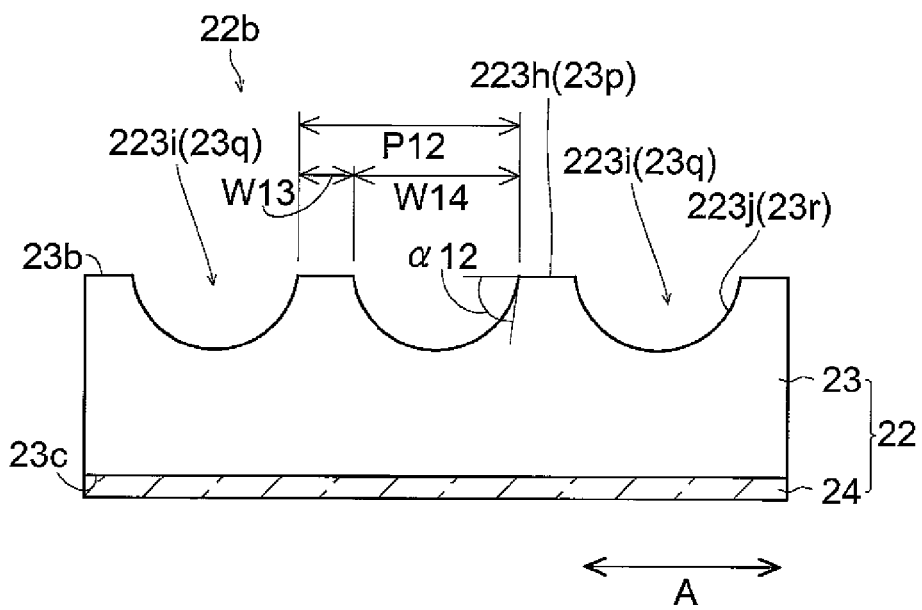
FIG. 38 is a drawing corresponding to a cross section along line a3-a3 of FIG. 35 (a drawing showing another example)
Figure 39:
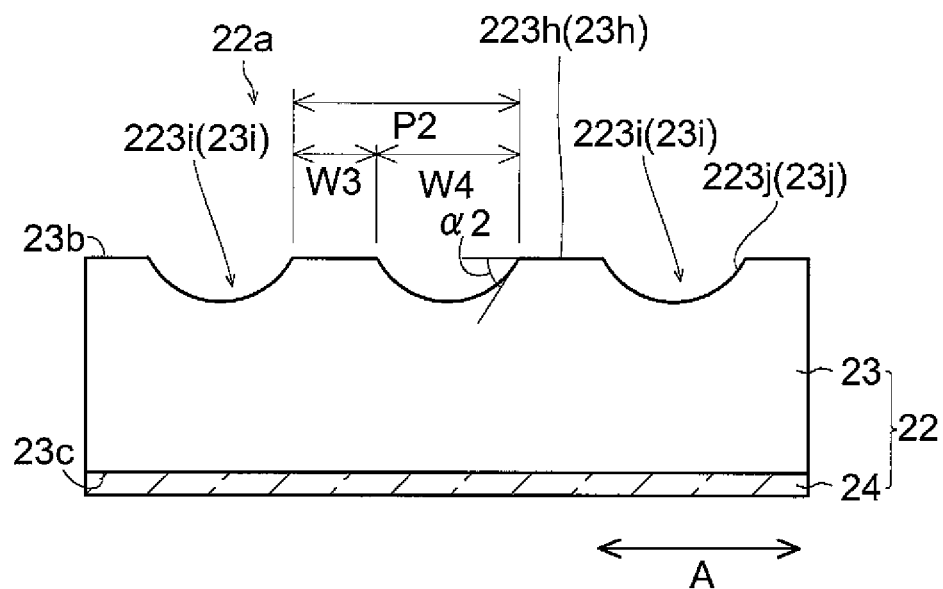
FIG. 39 is a drawing corresponding to a cross section along line a4-a4 of FIG. 35 (a drawing showing another example)

FIG. 35 is a plan view schematically depicting part of the backlight unit according to a second embodiment of the present invention. FIG. 36 is a cross-sectional view along line a3-a3 in FIG. 35, and FIG. 37 is a cross-sectional view along line a4-a4 in FIG. 35. FIGS. 38 and 39 are cross-sectional views depicting another example of the second embodiment. FIG. 38 is a drawing corresponding to a cross section along line a3-a3 of FIG. 35, and FIG. 39 is a drawing corresponding to a cross section along line a4-a4 of FIG. 35. Next is a description, referring to FIGS. 3 and 35 to 39, of a backlight unit according to the second embodiment of the present invention. In these drawings, redundant descriptions are appropriately omitted by adding the same symbols to corresponding structural elements.

In the second embodiment, a plurality of concave prisms 223i extending continuously from the end area 22b to the light-emitting area 22a are formed as shown in FIG. 35. Specifically, in the second embodiment, prisms are not formed individually between the end area 22b and the light-emitting area 22a, but the prisms of the end area 22b and the prisms of the light-emitting area 22a have a continuous shape. More specifically, the prisms 223i are formed in the light-guiding element 23 with the prisms 23i and the prisms 23q having continuous shapes, which had been formed individually in the first embodiment.

The prisms 223i formed in the front surface 23b of the light-guiding element 23 are formed so as to have triangular cross sections, as shown in FIGS. 36 and 37. The prisms 223i have a pair of inclined surfaces 223j. Furthermore, the prisms 223i are formed so as to extend in the normal direction (the B direction) of the light-incident surface 23a. The concave prisms 223i are one example of the "concave parts" of the present invention.

Flat surface parts 223h are formed between prisms 223i that are adjacent in the A direction. The prisms 223i become deeper toward the light-incident surface 23a (see FIG. 35), as shown in FIGS. 35 to 37. The incline angle of the inclined surfaces 223j of the prisms 223i is constant, and the width of the prisms 223i in the A direction therefore increases as well when the prisms are deepened. Therefore, the width of the prisms 223i in the A direction increases toward the light-incident surface 23a. The surface area occupied (the percentage occupied) by the prisms 223i (the inclined surfaces 223j) is thereby greater in the end area 22b than in the light-emitting area 22a.

When the surface area occupied (the percentage occupied) by the prisms 223i (the inclined surfaces 223j) is greater, the occurrence of V-shaped bright lines is suppressed because the spreading of light in the transverse direction is minimized. Conversely, the linear irregularities are intensified when the percentage occupied in the light-emitting area 22a is the same as in the end area 22b.

Therefore, in the second embodiment, the prisms 223i are formed so that the surface area occupied (the percentage occupied) by the prisms (the inclined surfaces 223j) is greater in the end area 22b of the light-guiding element 23, and the surface area occupied (the percentage occupied) by the prisms 223i (the inclined surfaces 223j) is less in the light-emitting area 22a. Therefore, the occurrence of V-shaped bright lines and linear irregularities is effectively suppressed.

The prisms 223i configured in this manner fulfill the role of the prisms 23q (see FIG. 3) of the first embodiment in the end area 22b, and fulfill the role of the prisms 23i (see FIG. 3) of the first embodiment in the light-emitting area 22a. Specifically, the role of the prisms 23q and the prisms 23i can be fulfilled by the prisms 223i alone.

Because the inclined surfaces 223j have the same incline angle in the end area 22b and the light-emitting area 22a, the incline angle $\alpha12$ of FIG. 36 and the incline angle $\alpha2$ of FIG. 37 are the same ($\alpha2=\alpha12$). The A-directional pitch of the prisms 223i also does not change depending on the location. Therefore, the pitch P12 (see FIG. 36) of the prisms 223i in the end area 22b and the pitch P2 (see FIG. 37) of the prisms 223i in the light-emitting area 22a are equal (W13+W14=W3+W4). The A-directional width of the prisms 223i is greater in the end area 22b than in the light-emitting area 22a, and conversely, the width of the flat surface parts 223h is less in the end area 22b than in the light-emitting area 22a. Therefore, these widths have the relationships W14>W4 and W13<W3.

The rest of the configuration of the second embodiment is identical to the first embodiment described above.

In the second embodiment, the occurrence of V-shaped bright lines and linear irregularities can be effectively suppressed easily, by forming concave prisms 223i extending continuously from the end area 22b to the light-emitting area 22a as described above.

In the second embodiment, because the role of the prisms 23q and the prisms 23i can be fulfilled by the prisms 223i alone, shaping the prisms is easy. Therefore, the light-guiding plate 22 can be formed at lower cost than in the first embodiment described above.

The rest of the effects of the second embodiment are identical to those of the first embodiment described above.

In the embodiment described above, an example was presented in which the prisms 223i were formed so as to have triangular cross sections. However, the shapes of the prisms 223i may be shapes other than triangular cross sections. For example, the prisms 223i may be formed so as to have arcuate cross sections (so as to have curved inclined surfaces) as shown in FIGS. 38 and 39.

When the prisms 223i are deepened in cases of the cross sections being arcuate, the incline angle of the inclined surfaces 223j increases in addition to the width in the A direction increasing. When the incline angle increases, there is a greater effect of suppressing V-shaped bright lines. Therefore, the occurrence of V-shaped bright lines can be suppressed more effectively if the prisms 223i are formed so as to have arcuate cross sections.

When the prisms 223i have arcuate cross sections, the incline angles of the inclined surfaces 223j are greater in the end area 22b (see FIG. 38) than in the light-emitting area 22a (see FIG. 39) ($\alpha 12 > \alpha 2$). The A-directional pitch of the prisms 223i does not change by location. Therefore, the pitch P12 (see FIG. 38) of the prisms 223i in the end area 22b and the pitch P2 (see FIG. 39) of the prisms 223i in the light-emitting area 22a are equal (W13+W14=W3+W4). The A-directional width of the prisms 223i is greater in the end area 22b than in the light-emitting area 22a, and conversely, the width of the flat surface parts 223h is less in the end area 22b than in the light-emitting area 22a. Therefore, the relationships W14>W4 and W13<W3 are established.

Third Embodiment

Figure 40:
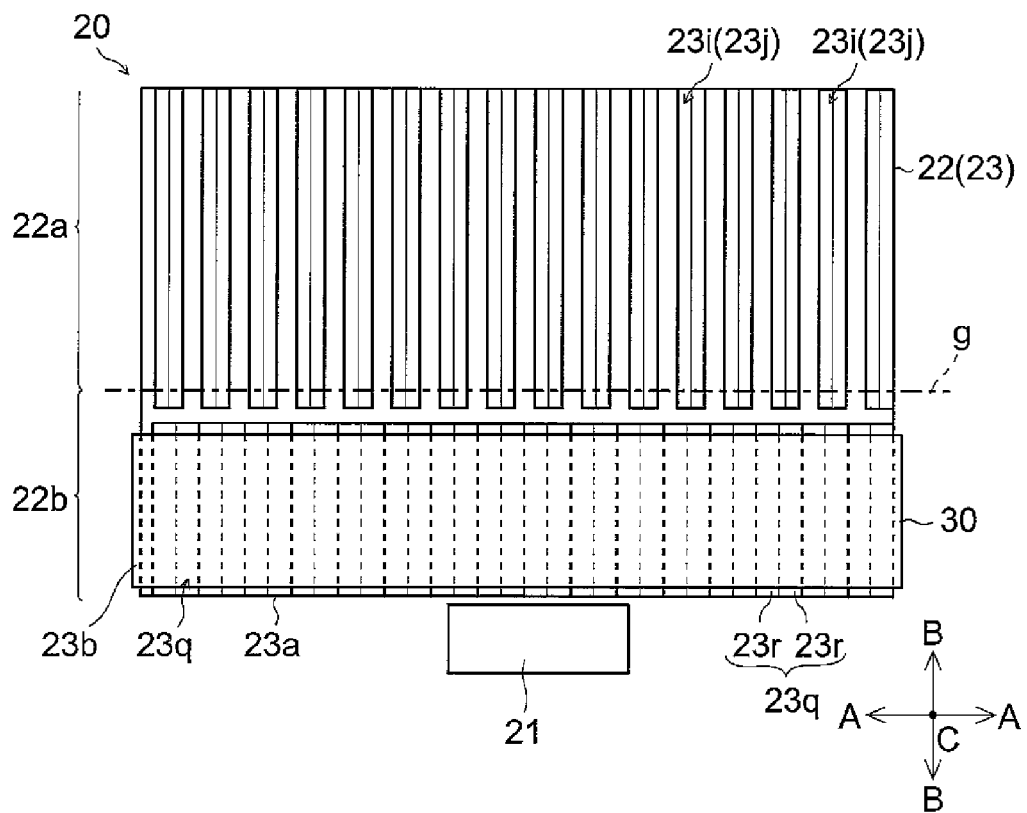
FIG. 40 is a plan view schematically depicting part of a backlight unit according to a third embodiment of the present invention.

FIG. 40 is a plan view schematically depicting part of the backlight unit according to the third embodiment of the present invention. FIG. 41 is a schematic cross-sectional view for describing the backlight unit according to the third embodiment of the present invention. Next is a description, referring to FIGS. 40 and 41, of the backlight unit according to the third embodiment of the present invention. In these drawings, redundant descriptions are appropriately omitted by adding the same symbols to corresponding structural elements.

The third embodiment has a configuration similar to the first embodiment described above, wherein a reflective layer 30 is disposed on all or part of the end area 22b (near the light entry part), as shown in FIG. 40. For example, the reflective layer 30 is composed of a reflective plate coated with silver, a reflective sheet such as a white PET resin, or the like. The reflective layer 30 may be disposed on the light-guiding plate 22 (the light-guiding element 23), and may be firmly bonded with the light-guiding plate 22 (the light-guiding element 23) by an adhesive layer (not shown) or the like. The reflective layer 30 may also be formed by forming a reflective film such as aluminum or silver, which has high reflectivity, directly on the light-guiding plate 22.

Figure 41A:
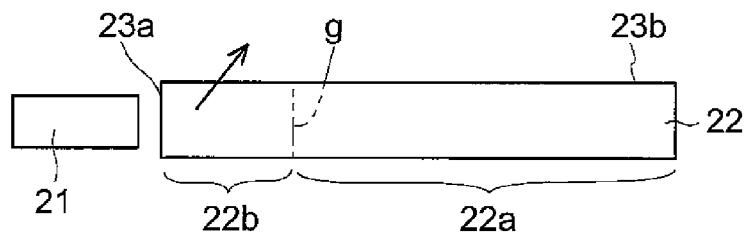
FIG. 41 is a schematic cross-sectional view for describing the backlight unit according to the third embodiment of the present invention.

When there is no reflective layer 30 in the area where the prisms 23q of the light-guiding plate 22 are formed (the end area 22b), some of the light reaching the inclined surfaces 23r of the prisms 23q is emitted into the air as shown in FIG. 41(A) (refer to the arrow). In this case, the light emitted into the air is lost (the light constitutes loss).

Figure 41B:
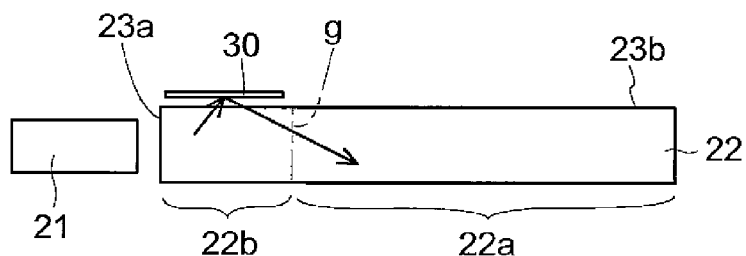

When the reflective layer 30 is provided to the area where the prisms 23q of the light-guiding plate 22 are formed (the end area 22b) as shown in FIG. 40, the light previously described is also reflected by the reflective layer 30 as shown in FIG. 41(B). This light is thereby incident within the light-guiding plate 22 again.

The rest of the configuration of the third embodiment is identical to the first embodiment described above. The configuration of the second embodiment can also be provided with the reflective layer 30.

In the third embodiment, light emitted into the air layer (into the air), for example, can be reflected by the reflective layer 30 and made to be incident in the light-guiding element 23 by providing the prisms 23q (the end area 22b) with the reflective layer 30 for reflecting light emitted from the prisms 23q to the exterior as described above. Light utilization efficiency can thereby be improved, in terms of reducing light loss.

The rest of the effect of the third embodiment is identical to the first embodiment described above. When the reflective layer 30 is provided to the configuration of the second embodiment, the other effects of the third embodiment are identical to the first and second embodiments.

Fourth Embodiment

Figure 42:
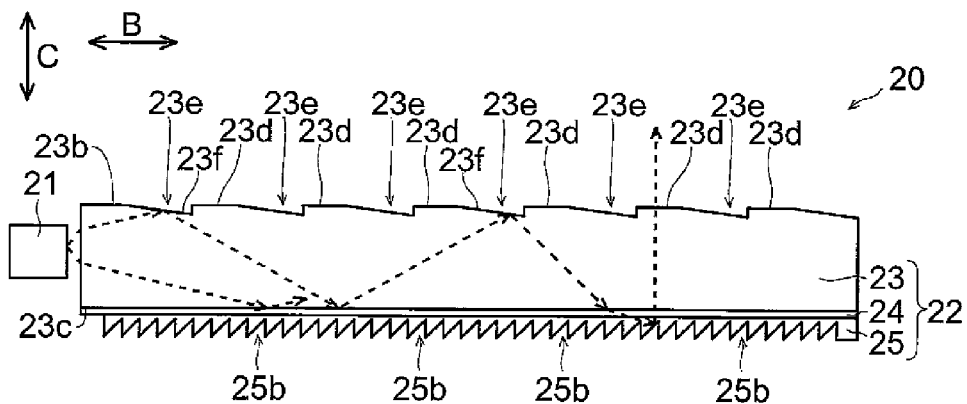
FIG. 42 is a cross-sectional view schematically depicting a backlight unit according to a fourth embodiment of the present invention.

FIG. 42 is a cross-sectional view schematically depicting the backlight unit according to the fourth embodiment of the present invention. Next is a description, referring to FIGS. 1 and 42, of the backlight unit according to the fourth embodiment of the present invention. In FIG. 42, redundant descriptions are appropriately omitted by adding the same symbols to corresponding structural elements.

The fourth embodiment has a configuration in which a prism layer 25 is also formed in addition to the low-refractive-index layer 24 on the rear surface 23c side of the light-guiding element 23, as shown in FIG. 42. Specifically, the fourth embodiment has a structure in which the low-refractive-index layer 24 is disposed between the light-guiding element 23 and the prism layer 25. The prism layer 25 is composed of a transparent material having a refractive index (n3), and is formed on the bottom surface (the rear surface) of the low-refractive-index layer 24 without any air layer or the like in between. In this case, the relationship n2<n3<n1 is preferably established among the refractive index (n1) of the light-guiding element 23, the refractive index (n2) of the low-refractive-index layer 24, and the refractive index (n3) of the prism layer 25.

In the fourth embodiment, prisms 25b capable of utilizing full reflection to collect light are formed in the rear surface of the prism layer 25 (the rear surface of the light-guiding plate 22). The prisms 25b have the same shape as the prisms 24b shown in the first embodiment (see FIG. 1). Specifically, the fourth embodiment has a configuration in which prisms 25b are formed in the prism layer 25 instead of the prisms 24b being formed in the low-refractive-index layer 24. The prisms 25b are an example of the "fourth reflective parts" of the present invention.

The rest of the configuration of the fourth embodiment is identical to the first through third embodiments described above. The effects of the fourth embodiment are also similar to those of the first through third embodiments described above.

Fifth Embodiment

Figure 43:
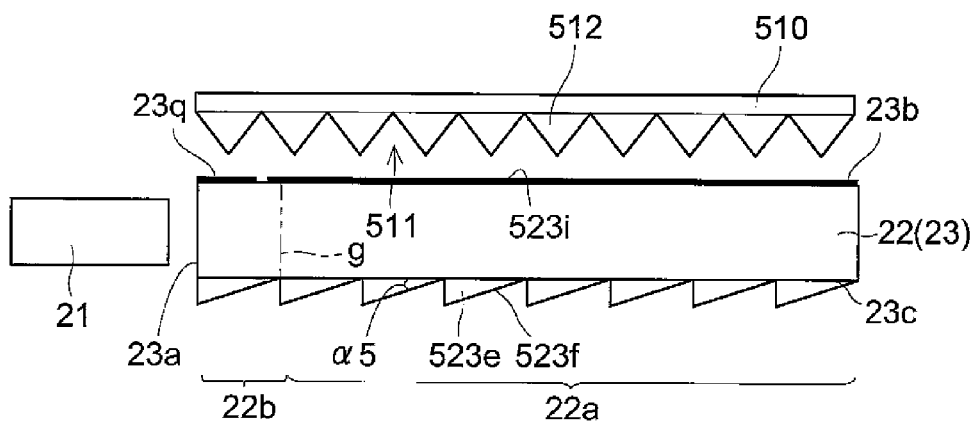
FIG. 43 is a cross-sectional view schematically depicting a backlight unit according to a fifth embodiment of the present invention.
Figure 44:
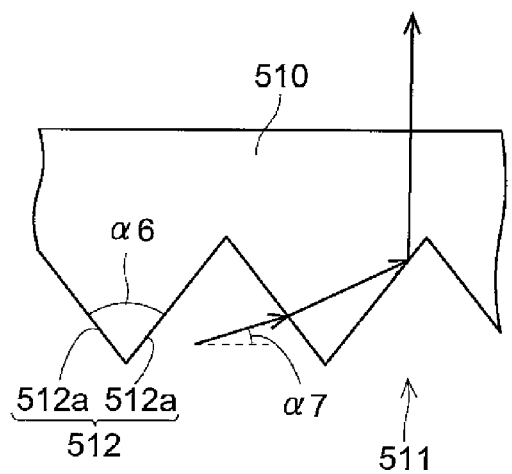
FIG. 44 is a cross-sectional view depicting an enlargement of part of the prism sheet shown in FIG. 43.

FIG. 43 is a cross-sectional view schematically depicting the backlight unit according to the fifth embodiment of the present invention. FIG. 44 is a cross-sectional view depicting an enlargement of part of the prism sheet depicted in FIG. 43. Next is a description, referring to FIGS. 1, 7, 43, and 44, of the backlight unit according to the fifth embodiment of the present invention. In these drawings, redundant descriptions are appropriately omitted by adding the same symbols to corresponding structural elements.

In the fifth embodiment, the backlight unit is a reverse prism system (a turning lens system) as shown in FIG. 43. Specifically, unlike the first through fourth embodiments described above, the light-guiding plate 22 constituting the backlight unit is configured without a low-refractive-index layer. In other words, the light-guiding plate 22 is composed of the light-guiding element 23 in the fifth embodiment.

In the fifth embodiment, prisms 523e having the same function as the prisms 23e (see FIG. 1) are formed in the rear surface 23c (the bottom surface) of the light-guiding plate 22 (the light-guiding element 23), for example, and prisms 523i or an embossing pattern 523i having the same function as the prisms 23i (see FIG. 7) is formed in the front surface 23b (the top surface) of the light-guiding plate 22 (the light-guiding element 23). Similar to the first embodiment described above, flat surface parts may be formed between prisms 523e that are adjacent in the B direction (e.g. the length direction of the light-guiding plate 22). The prisms 523e formed in the rear surface 23c of the light-guiding plate 22 (the light-guiding element 23) have inclined surfaces 523f that are inclined at an incline angle α5. The incline angle α5 of the inclined surfaces 523f is about 1° to 2°, for example. The prisms 523e are preferably formed in either the front surface 23b (the top surface) or the rear surface 23c (the bottom surface) of the light-guiding plate 22 (the light-guiding element 23), and the prisms 523i or the embossing pattern 523i are also preferably formed in either the front surface 23b (the top surface) or the rear surface 23c (the bottom surface) of the light-guiding plate 22.

Furthermore, in the fifth embodiment, a prism sheet 510 (a one-sided prism sheet) having a prism surface 511 is placed over the light-guiding plate 22. This prism sheet 510 is placed so as to overlap with the light-guiding plate 22 (the light-guiding element 23). The prism surface 511 of the prism sheet 510 faces the front surface 23b of the light-guiding plate 22 (the light-guiding element 23). A plurality of prisms 512 are formed in the prism surface 511 of the prism sheet 510. These prisms 512 are formed so as to have triangular cross sections. Each of the prisms 512 has a pair of inclined surfaces 512a as shown in FIG. 44. The angle α6 formed by the pair of inclined surfaces 512a (the peak angle α6 of each prism 512) is approximately 65° to approximately 70°, for example. The prisms 523i and the embossing pattern 523i are each one example of the "second reflective part" of the present invention, and the prism sheet 510 is one example of the "optical sheet" of the present invention.

An air layer is interposed between the prism sheet 510 and the light-guiding plate 22. This air layer fulfills the role of the low-refractive-index layer depicted in the first through fourth embodiments.

In a turning lens type backlight unit, light from the LEDs 21 is incident from the light-incident surface 23a and guided through the light-guiding plate 22 (the light-guiding element 23) as shown in FIG. 43, and the light is emitted from the front surface 23b of the light-guiding plate 22 toward the prism sheet 510. The light is emitted from the front surface 23b (the light-emitting surface 23b) of the light-guiding plate 22 at an angle α7 of approximately 20°, for example, as shown in FIG. 44, and the light is incident of the prisms 512 of the prism sheet 510. The incident light is fully reflected forward (refer to the arrow) by the prism sheet 510.

In a turning lens type backlight unit configured in this manner, light incident in the light-guiding plate 22 has spread (for example, Gauss dispersion or the like), depending on the presence of any surface roughness created by machining the light-incident surface 23a, as shown in FIG. 43. This spreading light reaches a critical angle or less in the end area 22b (near the light entry part), creating V-shaped bright lines, due to reaching the prisms 523i or the embossing pattern 523i formed in the front surface 23b, for example, of the light-guiding plate 22. Specifically, V-shaped bright lines occur readily even in this type of turning lens type backlight unit.

Therefore, in the fifth embodiment, the prisms 23q described above are formed in the end area 22b similar to the first through fourth embodiments described above. The prisms 23q may be formed in either the front surface 23b or the rear surface 23c of the light-guiding plate 22 (the light-guiding element 23). FIG. 43 shows an example in which the prisms are formed in the front surface 23b of the light-guiding plate 22.

The prisms 23q are formed so as to vary the propagation angle of light spreading in the transverse direction (the A direction) to a greater extent than the prisms 523i or the embossing pattern 523i, similar to the first through fourth embodiments described above. Therefore, the occurrence of V-shaped bright lines and linear irregularities is effectively suppressed in the fifth embodiment as well.

In the fifth embodiment, the number of optical sheets can be reduced by employing a turning lens type backlight unit as described above. Although employing a turning lens type backlight unit readily causes V-shaped bright lines and linear irregularities, the occurrence of V-shaped bright lines and linear irregularities can be effectively suppressed by providing prisms 23q and prisms 523i (or an embossing pattern 523i) to the light-guiding plate 22 (the light-guiding element 23).

The rest of the configuration and effects of the fifth embodiment is identical to the first embodiment described above.

The embodiments heretofore disclosed are merely examples on all points and should not be considered to be limiting. The scope of the invention is presented by the claims and not by the above descriptions of the embodiments, and the scope of the invention includes meanings equivalent to the scope of the claims and all alterations within this scope.

For example, in the first through fifth embodiments described above, examples were presented in which the illumination device was applied to a backlight unit, but the present invention is not limited to such examples, and may also be applied to illumination devices other than backlight units. For example, the illumination device of the present invention can also be applied to common forms of illumination such as indoor illumination and outside light.

In the first through fifth embodiments described above, examples were presented in which the present invention was applied to a sheetless backlight or a turning lens type backlight, but the present invention is not limited to these examples, and the present invention can also be applied to backlight units other than those described above.

In the first through fifth embodiments described above, examples were presented in which a display panel and a display device were applied to a liquid crystal display panel and a liquid crystal display device, respectively, but the present invention is not limited to these examples, and may be applied to display panels and display devices other than liquid crystal display panels and liquid crystal display devices.

Figure 45:
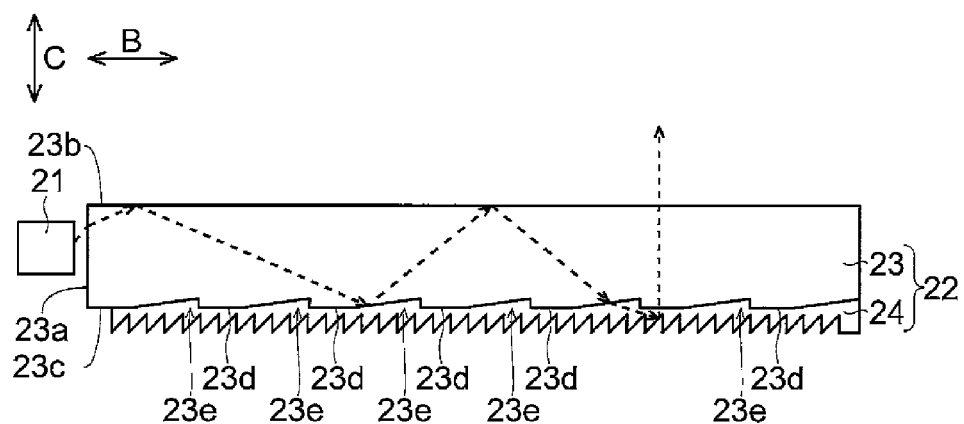
FIG. 45 is a cross-sectional view schematically depicting a backlight unit according to a first modification of the present invention.
Figure 46:
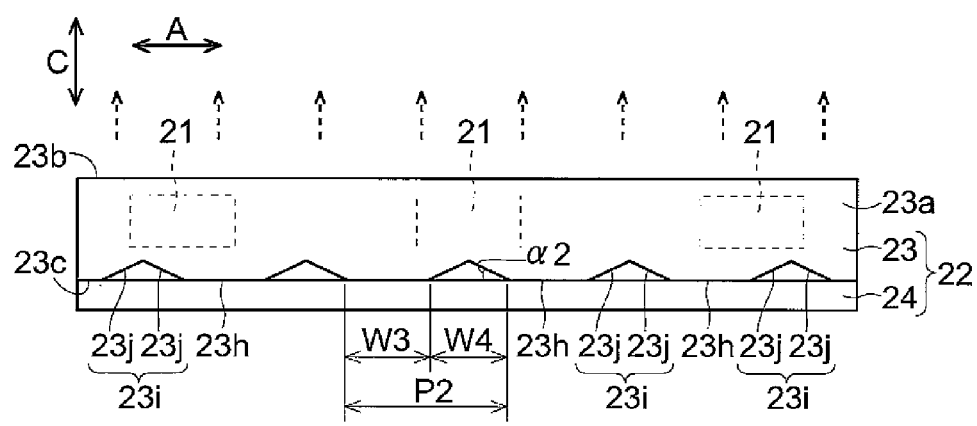
FIG. 46 is a cross-sectional view schematically depicting a backlight unit according to a second modification of the present invention.

In the first through fourth embodiments described above, examples were presented in which prisms for gradually reducing the incidence angle of light from the LEDs facing the rear surface of the light-guiding element and prisms for diffusing light in the transverse direction were formed on the light-emitting surface (the front surface) of the light-guiding element, but the present invention is not limited to these examples, and the aforementioned prisms may be formed in locations other than the light-emitting surface (the front surface) of the light-guiding element. For example, the prisms 23e, which gradually reduce the incidence angle of light from the LEDs 21 relative to the rear surface 23c of the light-guiding element 23, may be formed in the rear surface 23c of the light-guiding element 23 as shown in FIG. 45. The prisms 23i for diffusing light in the transverse direction may also be formed in the rear surface 23c of the light-guiding element 23 as shown in FIG. 46. Both the prisms 23e and the prisms 23i may be formed in the rear surface 23c of the light-guiding element 23, and either may be formed in the rear surface 23c of the light-guiding element 23.

Furthermore, in the embodiments described above, examples were presented in which the prisms (prisms 23q) formed in the end area of the light-guiding element were formed in the light-emitting surface (the front surface) of the light-guiding element, but the present invention is not limited to these examples, and the prisms of the end area (the prisms 23q) may be formed in the rear surface of the light-guiding element. The prisms 23q and the prisms 23i may be formed in the same surface as shown in the embodiments described above, or the prisms may be formed in different surfaces unlike the embodiments described above.

In the embodiments described above, the prisms formed in the light-guiding element (the prisms 23e, the prisms 23i, and the prisms 23q) may be formed in one surface of the light-guiding element (either the front surface or the rear surface), or the prisms may be formed in both surfaces of the light-guiding element (the front surface and the rear surface).

In the embodiments described above, materials having different refractive indexes may be interposed between the light-guiding element (refractive index n1) and the low-refractive-index layer (refractive index n2). In this case, denoting the refractive index of the interposed layer as a refractive index (n5), the refractive index (n5) is preferably n2<n5≤n1.

Figure 47:
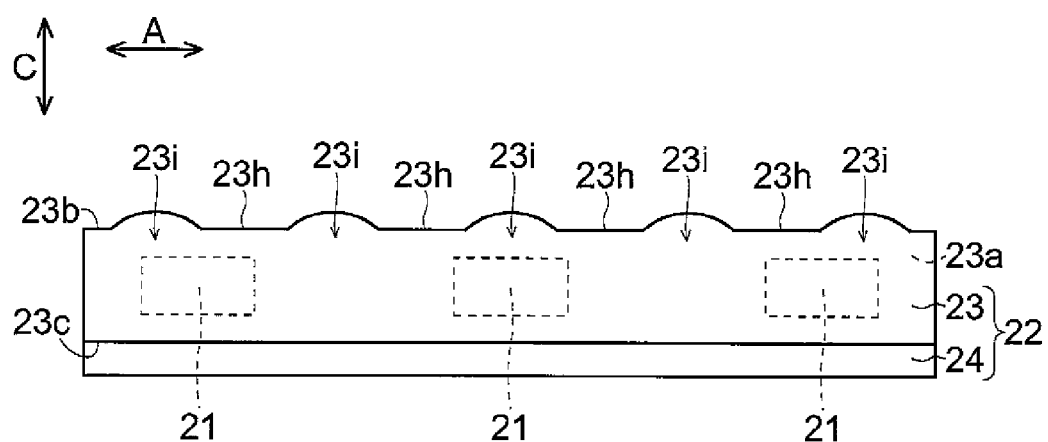
FIG. 47 is a cross-sectional view schematically depicting a backlight unit according to a third modification of the present invention.
Figure 48:
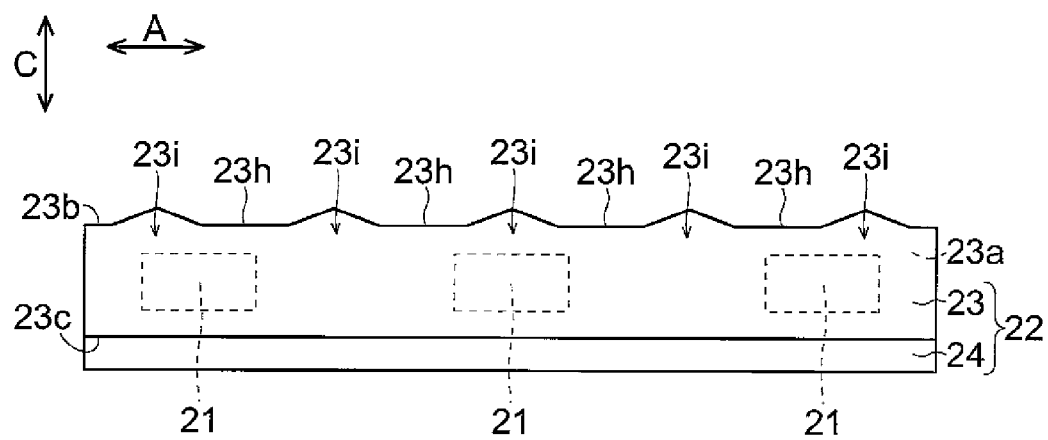
FIG. 48 is a cross-sectional view schematically depicting a backlight unit according to a fourth modification of the present invention.

In the embodiments described above, examples were presented in which the prisms for gradually reducing the incidence angle of light from the LEDs relative to the rear surface of the light-guiding element (the prisms 23e) and the prisms for diffusing light in the transverse direction (the prisms 23i) were both formed into concave shapes, but the present invention is not limited to these examples, and the aforementioned prisms may be formed into other shapes besides concave (e.g. convex). To use prisms for diffusing light in the transverse direction, formed in the light-emitting area, as an example, the prisms 23i can be convex shapes protruding upward, as shown in FIGS. 47 and 48, for example. In this case, the convex prisms 23i may be formed so as to have arcuate cross sections, for example, as shown in FIG. 47. The convex prisms 23i may also be formed so as to have triangular cross sections, for example, as shown in FIG. 48. The prisms may also have other shapes besides those described above, such as ellipses. Similarly, the prisms for gradually reducing the incidence angle of light from the LEDs relative to the rear surface of the light-guiding element (the prisms 23e) and the prisms formed in the end area (the prisms 23q) can also have various shapes such as convex shapes. The prisms 23i and the prisms 23q can also be formed from continuous convexities.

In the embodiments described above, examples were presented in which the prisms of the end area (the prisms 23q) and the prisms for diffusing light in the transverse direction (the prisms 23i) were formed so as to extend in a direction substantially perpendicular to the light-incident surface, but the present invention is not limited to these examples, and the prisms may have other shapes as long as the shapes have the same functions as those described above.

In the embodiments described above, the reflective plate was provided to the rear surface side of the light-guiding plate. The configuration of the light-guiding plate is not particularly limited, but the reflective plate is preferably formed from a reflective plate configured from a dielectric multilayer mirror, a reflective plate coated with silver, or a reflective plate composed of a white PET resin. A diffusing plate for diffusing light may also be provided between the light-guiding plate and the display panel.

In the embodiments described above, examples were presented in which LEDs were used as the light source, but the present invention is not limited to these examples, and light-emitting elements other than LEDs may be used as the light source, or a light source other than a light-emitting element (e.g. a CCFL or the like) may be used. A light source is also preferably disposed on at least one side of the backlight unit (the light-guiding element).

The values disclosed in the above embodiments, such as the angles and widths, constitute only one example, and the angles, widths, and other dimensions may be formed to values different from those of the above embodiments.

In the embodiments described above, examples were presented in which the prisms were formed using a flat plate-shaped mold and a quartz substrate when the light-guiding plate was formed, but the present invention is not limited to these examples, and the prisms may be formed using a roll-shaped mold and a quartz substrate when the light-guiding plate is formed.

In the embodiments described above, examples were presented in which the low-refractive-index layer was formed on the light-guiding element after the prisms were formed in the light-guiding element using heat imprinting, but the present invention is not limited to these examples, and the prisms may be formed after the low-refractive-index layer is formed on the light-guiding element, for example.

Figure 49:
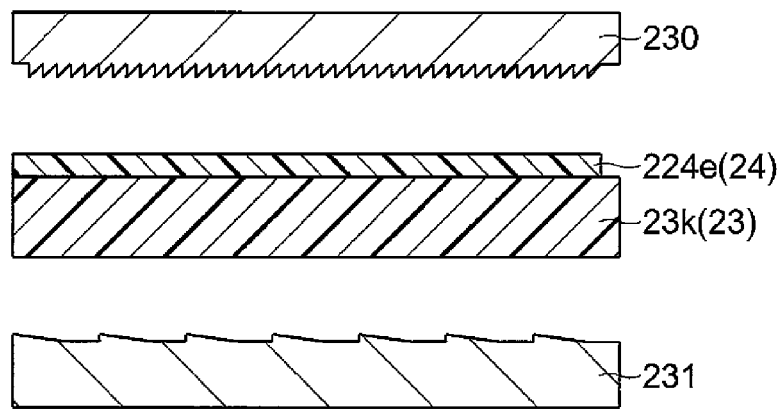
FIG. 49 is a cross-sectional view for describing another step of manufacturing the light-guiding plate of the backlight unit.
Figure 50:
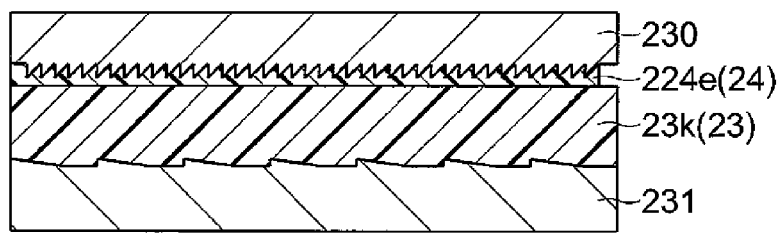
FIG. 50 is a cross-sectional view for describing another step of manufacturing the light-guiding plate of the backlight unit.
Figure 51:
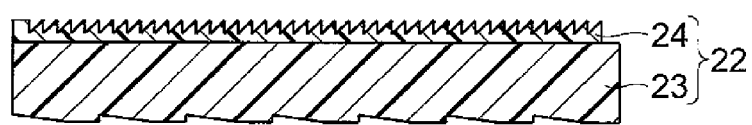
FIG. 51 is a cross-sectional view for describing another step of manufacturing the light-guiding plate of the backlight unit.

Specifically, first, a film material 224e to form the low-refractive-index layer 24 is stacked on the film material 23k to form the light-guiding element 23, as shown in FIG. 49. Next, the film materials 23k and 224e are disposed between a top mold 230 and a bottom mold 231. The film materials 23k and 224e are then heated and compressed by the top mold 230 and the bottom mold 231, as shown in FIG. 50. The film materials 23k and 224e are thereby formed into the desired shapes. The film materials 23k and 224e are then peeled away from the top mold 230 and the bottom mold 231, cooled, and separated into individual pieces, thereby forming the light-guiding plate 22 composed of the light-guiding element 23 and the low-refractive-index layer 24 as shown in FIG. 51.

When prisms are formed in the rear surface of the light-guiding element, a sheet (a film material: refractive index (n11)) containing the prisms 23e or the prisms 23i formed in the surface constituting the interface with the low-refractive-index layer, and a sheet (a film material: refractive index (n13)) in which the prisms 24b (25b) are formed, are prepared by being adhered together by a sheet (a film material: refractive index (n12)) constituting the low-refractive-index layer. At this time, the relationship of the refractive indexes of the sheets is n12<n13<n11.

In the third embodiment described above, an example was presented in which the reflective layer was provided to the configuration of the first embodiment, but the present invention is not limited to these example, and the reflective layer presented in the third embodiment may be provided to the configuration of the fourth or fifth embodiment.

In the fifth embodiment described above, an example was presented in which a one-sided prism sheet having a prism surface on one side was used, but the prism sheet used in the backlight unit may be a two-sided prism sheet, for example, instead of a one-sided prism sheet. In this case, for example, a prism sheet or the like can be used in which the light-guiding plate side has a prism surface and microlenses or the like are formed in the surface on the opposite side (the top surface).

The technical scope of the present invention also includes embodiments obtained by appropriately combining the techniques disclosed above.

LIST OF REFERENCE SIGNS

1 Liquid crystal display device (display device)
10 Liquid crystal display panel (display panel)
11 Active matrix substrate
12 Opposing substrate
13 Polarizing film
20 Backlight unit (illumination device)
21 LED (light source)
22 Light-guiding plate (light-guiding member)
22a Light-emitting area
22b End area
23 Light-guiding element
23a Light-incident surface (light entry surface)
23b Light-emitting surface, front surface (top surface)
23c Rear surface (bottom surface)
23d Flat surface part
23e Prism (third reflective part)
23f Inclined surface
23g Perpendicular surface
23h Flat surface part
23i Prism (second reflective part)
23j Inclined surface (second inclined surface)
23p Flat surface part
23q Prism (first reflective part)
23r Inclined surface (first inclined surface)
Low-refractive-index layer
24a Rear surface
24b Prism (fourth reflective part)
24c Inclined surface
25 Prism layer
25b Prism (fourth reflective part)
30 Reflective layer
223i Prism (concave part)

The invention claimed is:

1. An illumination device comprising:
   a light source; and
   a light-guiding element for guiding light from the light source;
   the light-guiding element including a first reflective part formed in an end area on the light source side, and a second reflective part formed in an area on the side opposite the light source relative to the end area; and
   the first reflective part causing the propagation angle of light spreading in a direction intersecting the direction of light entry to vary to a greater extent than the second reflective part.

2. The illumination device according to claim 1, the first reflective part reflecting incoming light in a direction toward the optical axis of light from the light source.

3. The illumination device according to claim 1, the first reflective part and the second reflective part being of different shape.

4. The illumination device according to claim 1, the light-guiding element having a light entry surface which is a side surface where light from the light source enters;
   the first reflective part having a first inclined surface extending in a substantially orthogonal direction from the light entry surface as seen in plan view; and
   the second reflective part having a second inclined surface extending in a substantially orthogonal direction relative to the light entry surface as seen in plan view.

5. The illumination device according to claim 1, the first reflective part and the second reflective part being formed on the front surface or the rear surface of the light-guiding element.

6. The illumination device according to claim 1, the light-guiding element having a light-emitting area for emitting incoming light as planar light; and
   the second reflective part being formed in the light-emitting area.

7. The illumination device according to claim 1, the second reflective part being formed as a continuation of the first reflective part.

8. The illumination device according to claim 7, the light-guiding element having a light entry surface which is a side surface where light from the light source enters;
   the first reflective part and the second reflective part extending continuously in a substantially orthogonal direction relative to the light entry surface as seen in plan view, and having concave parts or convex parts including inclined surfaces; and
   the depths of the concave parts or the heights of the convex parts preferably increasing nearer to the light entry surface.

9. The illumination device according to claim 1, a reflective layer for reflecting light emitted from the first reflective part to the exterior being provided above the first reflective part.

10. The illumination device according to claim 9, the reflective layer being provided so as to cover at least part of the first reflective part.

11. The illumination device according to claim 1, comprising a light-guiding member that includes a light-guiding element and a low-refractive-index layer having a lower refractive index than the light-guiding element;
   the low-refractive-index layer being provided on the rear surface of the light-guiding element without any air layer in between;
   the front surface or rear surface of the light-guiding element being provided with a plurality of third reflective parts that gradually reduce the incidence angle of the light from the light source relative to the rear surface of the light-guiding element; and the rear surface of the light-guiding member being provided with a plurality of fourth reflective parts for fully reflecting light from the light source forward in the interface between the rear surface of the light-guiding member and the air layer.

12. The illumination device according to claim 1, further comprising an optical sheet overlapping the light-guiding element, the optical sheet having a prism surface; and
the optical sheet being disposed so that the prism surface faces toward the light-guiding element.

13. The illumination device according to claim 1, the front surface and the rear surface of the light-guiding element being formed so as to be substantially parallel to each other.

14. A display device comprising:
the illumination device according to claim 1; and
a display panel for receiving light from the illumination device.

* * * * *